(12) United States Patent
Murata et al.

(10) Patent No.: US 10,503,016 B2
(45) Date of Patent: *Dec. 10, 2019

(54) LIQUID CRYSTAL DISPLAY DEVICE, POLARIZER AND PROTECTIVE FILM

(71) Applicant: TOYOBO CO., LTD., Osaka-shi, Osaka (JP)

(72) Inventors: Koichi Murata, Tsuruga (JP); Yasushi Sasaki, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,186

(22) Filed: Jan. 3, 2018

(65) Prior Publication Data

US 2018/0173038 A1     Jun. 21, 2018

Related U.S. Application Data

(63) Continuation of application No. 15/476,339, filed on Mar. 31, 2017, now Pat. No. 9,897,857, which is a
(Continued)

(30) Foreign Application Priority Data

Jun. 22, 2010   (JP)  ................................ 2010-141249
May 18, 2011   (JP)  ................................ 2011-111442

(51) Int. Cl.
*G02F 1/13363*     (2006.01)
*G02F 1/1335*     (2006.01)
(Continued)

(52) U.S. Cl.
CPC ....... *G02F 1/13363* (2013.01); *G02B 5/3083* (2013.01); *G02F 1/1336* (2013.01);
(Continued)

(58) Field of Classification Search
CPC ............. G02F 1/13363; G02F 2202/40; G02F 1/133528; G02F 2201/50; G02F 1/133611;
(Continued)

(56) References Cited

U.S. PATENT DOCUMENTS 4,072,779 A    2/1978   Knox et al.
4,586,790 A    5/1986   Umeda et al.
(Continued)

FOREIGN PATENT DOCUMENTS

CN          1320219 A     10/2001
CN          1331272 A      1/2002
(Continued)

OTHER PUBLICATIONS

Yamaoka (editor-in-chief), Dictionary of Optical Application Technologies and Materials, p. 362 ("Phase difference/protective film integrated polarizing plate (Fig. 5.1.17)") (Sangyo-Gijutsu Service Center Co., Ltd. (publishing company), 2006).
(Continued)

*Primary Examiner* — Jia X Pan
(74) *Attorney, Agent, or Firm* — Leydig, Voit & Mayer, Ltd.

(57) ABSTRACT

Provided is a liquid crystal display device that has excellent visibility while using a protective film comprising a polyester film. The liquid crystal display device comprises a backlight light source, and a liquid crystal cell disposed between two polarizers; the backlight light source being a white light-emitting diode; each of the polarizers comprising a polarizing film and protective films laminated on both sides of the polarizing film; and at least one of the protective films being a polyester film having a retardation of 3,000 to 30,000 nm.

6 Claims, 1 Drawing Sheet

Related U.S. Application Data continuation of application No. 13/806,023, filed as application No. PCT/JP2011/064026 on Jun. 20, 2011, now Pat. No. 9,798,189.

(51) Int. Cl.
  *G02B 5/30* (2006.01)
  *G02F 1/13357* (2006.01)
  *G02B 1/10* (2015.01)

(52) U.S. Cl.
  CPC .... *G02F 1/13362* (2013.01); *G02F 1/133528* (2013.01); *G02B 1/105* (2013.01); *G02B 5/3033* (2013.01); *G02F 2001/133562* (2013.01); *G02F 2001/133567* (2013.01); *G02F 2001/133624* (2013.01); *G02F 2201/50* (2013.01); *G02F 2202/40* (2013.01)

(58) Field of Classification Search
  CPC .... G02B 5/3083; G02B 5/3033; G02B 1/111; Y10T 428/1041
  USPC .................................................. 349/117, 181
  See application file for complete search history.

(56) References Cited

U.S. PATENT DOCUMENTS

| | | | |
|---|---|---|---|
| 4,592,623 A * | 6/1986 | Yamamoto | G02B 5/3033 349/122 |
| 4,799,772 A | 1/1989 | Utsumi | |
| 5,145,746 A | 9/1992 | Tomoyuki | |
| 5,231,145 A | 7/1993 | Brueckmann et al. | |
| 5,677,024 A | 10/1997 | Abe et al. | |
| 5,757,447 A | 5/1998 | Kobayashi et al. | |
| 5,998,925 A | 12/1999 | Shimizu et al. | |
| 6,025,433 A | 2/2000 | Shibatoh et al. | |
| 6,055,096 A | 4/2000 | Michihata et al. | |
| 6,069,440 A | 5/2000 | Shimizu et al. | |
| 6,104,484 A | 8/2000 | Nagata et al. | |
| 6,280,890 B1 | 8/2001 | Sawamura et al. | |
| 6,285,430 B1 | 9/2001 | Saito | |
| 6,521,700 B1 | 2/2003 | Dworak et al. | |
| 6,608,332 B2 | 8/2003 | Shimizu et al. | |
| 6,614,179 B1 | 9/2003 | Shimizu et al. | |
| 6,839,171 B2 | 1/2005 | Mizutani et al. | |
| 7,026,756 B2 | 4/2006 | Shimizu et al. | |
| 7,071,616 B2 | 7/2006 | Shimizu et al. | |
| 7,126,274 B2 | 10/2006 | Shimizu et al. | |
| 7,128,952 B2 | 10/2006 | Murakami et al. | |
| 7,215,074 B2 | 5/2007 | Shimizu et al. | |
| 7,329,988 B2 | 2/2008 | Shimizu et al. | |
| 7,354,150 B2 | 4/2008 | Sugimura et al. | |
| 7,362,048 B2 | 4/2008 | Shimizu et al. | |
| 7,531,960 B2 | 5/2009 | Shimizu et al. | |
| 7,569,269 B2 | 8/2009 | Takada et al. | |
| 7,633,583 B2 | 12/2009 | Wang et al. | |
| 7,682,848 B2 | 3/2010 | Shimizu et al. | |
| 7,781,068 B2 | 8/2010 | Nakamura et al. | |
| 7,855,092 B2 | 12/2010 | Shimizu et al. | |
| 7,887,718 B2 | 2/2011 | Nagatomi et al. | |
| 7,901,959 B2 | 3/2011 | Shimizu et al. | |
| 7,911,553 B2 | 3/2011 | Tanaka | |
| 7,915,631 B2 | 3/2011 | Shimizu et al. | |
| 7,943,941 B2 | 5/2011 | Shimizu et al. | |
| 7,968,019 B2 | 6/2011 | Murakami | |
| 7,968,866 B2 | 6/2011 | Shimizu et al. | |
| 7,969,090 B2 | 6/2011 | Shimizu et al. | |
| 8,139,042 B2 | 3/2012 | Iijima | |
| 8,148,177 B2 | 4/2012 | Shimizu et al. | |
| 8,274,631 B2 | 9/2012 | Wang et al. | |
| 8,687,152 B2 | 4/2014 | Izaki et al. | |
| 8,760,601 B2 | 6/2014 | Izaki et al. | |
| 9,798,189 B2 * | 10/2017 | Murata | G02B 5/3083 |
| 9,897,857 B2 * | 2/2018 | Murata | G02B 5/3083 |
| 10,054,816 B2 | 8/2018 | Murata et al. | |
| 10,175,494 B2 | 1/2019 | Murata et al. | |
| 10,180,597 B2 | 1/2019 | Murata et al. | |
| 2001/0001207 A1 | 5/2001 | Shimizu et al. | |
| 2002/0061959 A1 | 5/2002 | Kajimaru et al. | |
| 2003/0156235 A1 | 8/2003 | Kuzuhara et al. | |
| 2004/0000868 A1 | 1/2004 | Shimizu et al. | |
| 2004/0004437 A1 | 1/2004 | Shimizu et al. | |
| 2004/0090180 A1 | 5/2004 | Shimizu et al. | |
| 2004/0109302 A1 | 6/2004 | Yoneda et al. | |
| 2004/0137265 A1 | 7/2004 | Shimada et al. | |
| 2004/0222435 A1 | 11/2004 | Shimizu et al. | |
| 2004/0265539 A1 | 12/2004 | Hashimoto et al. | |
| 2005/0030456 A1 | 2/2005 | Murakami et al. | |
| 2005/0100723 A1 | 5/2005 | Tanaka et al. | |
| 2005/0106334 A1 | 5/2005 | Kubo et al. | |
| 2005/0120528 A1 | 6/2005 | Okuda et al. | |
| 2005/0134774 A1 | 6/2005 | Coates et al. | |
| 2005/0168816 A1 | 8/2005 | Fukaishi et al. | |
| 2005/0247223 A1 | 11/2005 | Sampei | |
| 2005/0275779 A1 | 12/2005 | Nanno | |
| 2005/0280357 A1 | 12/2005 | Shimizu et al. | |
| 2006/0039070 A1 * | 2/2006 | Sugimura | G02B 5/305 359/487.02 |
| 2006/0061717 A1 | 3/2006 | Ichihashi | |
| 2006/0066946 A1 | 3/2006 | Liu et al. | |
| 2006/0210768 A1 | 9/2006 | Masuda | |
| 2006/0215091 A1 | 9/2006 | Muramoto et al. | |
| 2006/0216437 A1 | 9/2006 | Murakami | |
| 2006/0227439 A1 | 10/2006 | Taki et al. | |
| 2006/0275559 A1 | 12/2006 | Ishibashi et al. | |
| 2007/0008451 A1 | 1/2007 | Tanaka | |
| 2007/0009676 A1 | 1/2007 | Tamagawa et al. | |
| 2007/0046864 A1 | 3/2007 | Maruyama et al. | |
| 2007/0046865 A1 | 3/2007 | Umeda et al. | |
| 2007/0048460 A1 | 3/2007 | Ikeda | |
| 2007/0054066 A1 | 3/2007 | Usukura et al. | |
| 2007/0058149 A1 | 3/2007 | Oshida et al. | |
| 2007/0114914 A1 | 5/2007 | Shimizu et al. | |
| 2007/0159060 A1 | 7/2007 | Shimizu et al. | |
| 2007/0178297 A1 | 8/2007 | Takada et al. | |
| 2007/0184212 A1 | 8/2007 | Nimura et al. | |
| 2007/0202272 A1 | 8/2007 | Yamamoto et al. | |
| 2007/0224415 A1 | 9/2007 | Satake et al. | |
| 2007/0238049 A1 | 10/2007 | Ezure | |
| 2007/0242199 A1 | 10/2007 | Harada | |
| 2007/0264447 A1 | 11/2007 | Oya et al. | |
| 2007/0285776 A1 | 12/2007 | Nakamura et al. | |
| 2008/0036943 A1 | 2/2008 | Matsumoto et al. | |
| 2008/0049324 A1 | 2/2008 | Murakami et al. | |
| 2008/0050583 A1 | 2/2008 | Kubo | |
| 2008/0131704 A1 | 6/2008 | Mizuno et al. | |
| 2008/0138527 A1 | 6/2008 | Okuma et al. | |
| 2008/0138918 A1 | 6/2008 | Shimizu et al. | |
| 2008/0218666 A1 | 9/2008 | Toyooka | |
| 2008/0233312 A1 | 9/2008 | Nakamura et al. | |
| 2008/0239178 A1 | 10/2008 | Nagai et al. | |
| 2008/0246741 A1 | 10/2008 | Hinata | |
| 2008/0266500 A1 | 10/2008 | Nimura | |
| 2008/0303995 A1 | 12/2008 | Shimodaira et al. | |
| 2009/0027599 A1 | 1/2009 | Ohgaru et al. | |
| 2009/0059134 A1 | 3/2009 | Ishikawa et al. | |
| 2009/0104413 A1 | 4/2009 | Ahn et al. | |
| 2009/0139564 A1 | 6/2009 | Miyaji et al. | |
| 2009/0153965 A1 | 6/2009 | Ito et al. | |
| 2009/0244446 A1 | 10/2009 | Yasuda et al. | |
| 2009/0244474 A1 | 10/2009 | Fuchida et al. | |
| 2009/0251643 A1 | 10/2009 | Yamada et al. | |
| 2009/0280310 A1 | 11/2009 | Nitta et al. | |
| 2009/0303481 A1 | 12/2009 | Nakai | |
| 2009/0315014 A1 | 12/2009 | Shimizu et al. | |
| 2009/0315015 A1 | 12/2009 | Shimizu et al. | |
| 2009/0316068 A1 | 12/2009 | Shimizu et al. | |
| 2010/0001258 A1 | 1/2010 | Shimizu et al. | |
| 2010/0002171 A1 | 1/2010 | Yoshimi | |
| 2010/0006819 A1 | 1/2010 | Shimizu et al. | |
| 2010/0019224 A1 | 1/2010 | Shimizu et al. | |
| 2010/0019270 A1 | 1/2010 | Shimizu et al. | |
| 2010/0053511 A1 | 3/2010 | Ohmuro et al. | |
| 2010/0073313 A1 | 3/2010 | Iijima | |

(56) References Cited

U.S. PATENT DOCUMENTS

| | | |
|---|---|---|
| 2010/0098939 A1 | 4/2010 | Tada et al. |
| 2010/0117516 A1 | 5/2010 | Shimizu et al. |
| 2010/0177397 A1 | 7/2010 | Kamiyama et al. |
| 2010/0220266 A1* | 9/2010 | Kashima .............. G02B 1/105 349/96 |
| 2010/0233389 A1 | 9/2010 | Suzuki et al. |
| 2010/0264841 A1 | 10/2010 | Shimizu et al. |
| 2010/0264842 A1 | 10/2010 | Shimizu et al. |
| 2010/0296027 A1 | 11/2010 | Matsuhira et al. |
| 2011/0019275 A1 | 1/2011 | Suzuki |
| 2011/0053299 A1 | 3/2011 | Shimizu et al. |
| 2011/0062864 A1 | 3/2011 | Shimizu et al. |
| 2011/0085106 A1 | 4/2011 | Obata et al. |
| 2011/0128477 A1 | 6/2011 | Izaki et al. |
| 2011/0177314 A1 | 7/2011 | Tatami et al. |
| 2011/0194048 A1* | 8/2011 | Izaki ............. G02F 1/133528 349/62 |
| 2011/0199561 A1 | 8/2011 | Hasegawa et al. |
| 2011/0255227 A1 | 10/2011 | Murakami |
| 2011/0297990 A1 | 12/2011 | Shimizu et al. |
| 2012/0015169 A1 | 1/2012 | Ohta |
| 2012/0057230 A1 | 3/2012 | Murakami et al. |
| 2012/0081785 A1 | 4/2012 | Iida et al. |
| 2012/0113356 A1 | 5/2012 | Yu et al. |
| 2012/0113671 A1 | 5/2012 | Sadasivan et al. |
| 2012/0121824 A1 | 5/2012 | Toyama et al. |
| 2012/0189831 A1 | 7/2012 | Kawasaki et al. |
| 2012/0229732 A1 | 9/2012 | Koike et al. |
| 2012/0250142 A1 | 10/2012 | Kobuchi et al. |
| 2013/0039031 A1 | 2/2013 | Asano et al. |
| 2013/0100378 A1 | 4/2013 | Murata et al. |
| 2013/0194211 A1 | 8/2013 | Shinohara et al. |
| 2013/0272020 A1 | 10/2013 | Koide et al. |
| 2013/0278560 A1 | 10/2013 | Yamaguchi |
| 2013/0301130 A1 | 11/2013 | Nakamura et al. |
| 2014/0028625 A1 | 1/2014 | Maeda et al. |
| 2014/0098325 A1 | 4/2014 | Murata et al. |
| 2014/0104519 A1 | 4/2014 | Murata et al. |
| 2014/0232951 A1 | 8/2014 | Ueda et al. |
| 2014/0293197 A1 | 10/2014 | Shin et al. |
| 2015/0131038 A1 | 5/2015 | Ishiguro et al. |
| 2015/0131043 A1 | 5/2015 | Yamamoto et al. |
| 2015/0168779 A1 | 6/2015 | Kim et al. |
| 2015/0316696 A1 | 11/2015 | Kamijo et al. |
| 2015/0331282 A1 | 11/2015 | Yamada et al. |
| 2016/0011355 A1 | 1/2016 | Kokudo et al. |
| 2016/0048057 A1 | 2/2016 | Sekiguchi et al. |
| 2016/0209564 A1 | 7/2016 | Kuroda |
| 2017/0261794 A1 | 9/2017 | Murata et al. |
| 2017/0261974 A1 | 9/2017 | Murata et al. |
| 2019/0004367 A1 | 1/2019 | Koike et al. |
| 2019/0146280 A1 | 5/2019 | Murata et al. |

FOREIGN PATENT DOCUMENTS

| | | |
|---|---|---|
| CN | 1495925 A | 5/2004 |
| CN | 1623107 A | 6/2005 |
| CN | 1641897 A | 7/2005 |
| CN | 1656399 A | 8/2005 |
| CN | 1839176 A | 9/2006 |
| CN | 1892360 A | 1/2007 |
| CN | 1916667 A | 2/2007 |
| CN | 1927996 A | 3/2007 |
| CN | 1957273 A | 5/2007 |
| CN | 101067040 A | 11/2007 |
| CN | 101156092 A | 4/2008 |
| CN | 101273465 A | 9/2008 |
| CN | 101358144 A | 2/2009 |
| CN | 101661190 A | 3/2010 |
| CN | 101799564 A | 8/2010 |
| EP | 2871055 A1 | 5/2015 |
| JP | S14-018675 Y | 11/1939 |
| JP | S49-060317 A | 6/1974 |
| JP | S51-066163 U | 5/1976 |
| JP | S52-010100 A | 1/1977 |
| JP | S54-139921 A | 10/1979 |
| JP | S56-033611 A | 4/1981 |
| JP | S57-087331 A | 5/1982 |
| JP | S58-098709 A | 6/1983 |
| JP | S58-143305 A | 8/1983 |
| JP | S59-077401 A | 5/1984 |
| JP | S60-026304 A | 2/1985 |
| JP | S60-097323 A | 5/1985 |
| JP | S60-133402 U | 9/1985 |
| JP | S62-135338 A | 6/1987 |
| JP | S63-226603 A | 9/1988 |
| JP | S63-307403 A | 12/1988 |
| JP | H03-125302 U1 | 12/1991 |
| JP | H04-163138 A | 6/1992 |
| JP | H04-224811 A | 8/1992 |
| JP | H04-256903 A | 9/1992 |
| JP | H04-326419 A | 11/1992 |
| JP | H06-051117 A | 2/1994 |
| JP | H06-258634 A | 9/1994 |
| JP | H08-162070 A | 6/1996 |
| JP | H08-271733 A | 10/1996 |
| JP | H08-271734 A | 10/1996 |
| JP | H09-033722 A | 2/1997 |
| JP | H09-033920 A | 2/1997 |
| JP | H09-097017 A | 4/1997 |
| JP | H09-166711 A | 6/1997 |
| JP | H09-169950 A | 6/1997 |
| JP | H09-314782 A | 12/1997 |
| JP | H10-010522 A | 1/1998 |
| JP | H10-010558 A | 1/1998 |
| JP | H10-107325 A | 4/1998 |
| JP | H10-133817 A | 5/1998 |
| JP | H10-161108 A | 6/1998 |
| JP | H10-268270 A | 10/1998 |
| JP | H10-242513 A | 11/1998 |
| JP | H11-070629 A | 3/1999 |
| JP | H11-305217 A | 11/1999 |
| JP | 2000-082335 A | 3/2000 |
| JP | 2000-082338 A | 3/2000 |
| JP | 2000-141530 A | 5/2000 |
| JP | 2000-162419 A | 6/2000 |
| JP | 2000-206333 A | 7/2000 |
| JP | 2000-206335 A | 7/2000 |
| JP | 2000-208815 A | 7/2000 |
| JP | 2000-231450 A | 8/2000 |
| JP | 2000-241625 A | 9/2000 |
| JP | 2000-296595 A | 10/2000 |
| JP | 2001-026762 A | 1/2001 |
| JP | 2001-051115 A | 2/2001 |
| JP | 2001-059907 A | 3/2001 |
| JP | 2001-098089 A | 4/2001 |
| JP | 2001-116926 A | 4/2001 |
| JP | 2001-141922 A | 5/2001 |
| JP | 2001-181568 A | 7/2001 |
| JP | 2002-231032 A | 8/2001 |
| JP | 2001-272534 A | 10/2001 |
| JP | 2001-272682 A | 10/2001 |
| JP | 2001-334623 A | 12/2001 |
| JP | 2002-031905 A | 1/2002 |
| JP | 2002-071921 A | 3/2002 |
| JP | 2002-088334 A | 3/2002 |
| JP | 2002-509283 A | 3/2002 |
| JP | 2002-116320 A | 4/2002 |
| JP | 2002-116877 A | 4/2002 |
| JP | 2002-198573 A | 7/2002 |
| JP | 2003-121818 A | 4/2003 |
| JP | 2003-121819 A | 4/2003 |
| JP | 2003-179259 A | 6/2003 |
| JP | 2004-005540 A | 1/2004 |
| JP | 2004-009362 A | 1/2004 |
| JP | 2004-170875 A | 6/2004 |
| JP | 2004-189957 A | 7/2004 |
| JP | 2004-198929 A | 7/2004 |
| JP | 2004-205773 A | 7/2004 |
| JP | 2004-214069 A | 7/2004 |
| JP | 2004-219620 A | 8/2004 |
| JP | 2004-226591 A | 8/2004 |
| JP | 2004-226734 A | 8/2004 |

(56) References Cited

FOREIGN PATENT DOCUMENTS

| | | |
|---|---|---|
| JP | 2004-237451 A | 8/2004 |
| JP | 2004-252082 A | 9/2004 |
| JP | 2004-361774 A | 12/2004 |
| JP | 2005-114990 A | 4/2005 |
| JP | 2005-148519 A | 6/2005 |
| JP | 2005-157082 A | 6/2005 |
| JP | 2005-173462 A | 6/2005 |
| JP | 2005-181450 A | 7/2005 |
| JP | 2005-265889 A | 9/2005 |
| JP | 2005-266464 A | 9/2005 |
| JP | 2005-317985 A | 11/2005 |
| JP | 2005-321543 A | 11/2005 |
| JP | 2005-352068 A | 12/2005 |
| JP | 2006-062281 A | 3/2006 |
| JP | 2006-079067 A | 3/2006 |
| JP | 2006-106427 A | 4/2006 |
| JP | 2006-119623 A | 5/2006 |
| JP | 2006-133652 A | 5/2006 |
| JP | 2006-215107 A | 8/2006 |
| JP | 2006-215175 A | 8/2006 |
| JP | 2006-251294 A | 9/2006 |
| JP | 2006-251859 A | 9/2006 |
| JP | 2006-276574 A | 10/2006 |
| JP | 2006-276697 A | 10/2006 |
| JP | 2006-301592 A | 11/2006 |
| JP | 2006-308917 A | 11/2006 |
| JP | 2007-011280 A | 1/2007 |
| JP | 2007-039535 A | 2/2007 |
| JP | 2007-055222 A | 3/2007 |
| JP | 2007-059360 A | 3/2007 |
| JP | 2007-080953 A | 3/2007 |
| JP | 2007-086722 A | 4/2007 |
| JP | 2007-140248 A | 6/2007 |
| JP | 2007-152932 A | 6/2007 |
| JP | 2007-171707 A | 7/2007 |
| JP | 2007-233114 A | 9/2007 |
| JP | 2007-233129 A | 9/2007 |
| JP | 2007-253512 A | 10/2007 |
| JP | 2007-279243 A | 10/2007 |
| JP | 2007-279469 A | 10/2007 |
| JP | 2007-286447 A | 11/2007 |
| JP | 2007-304391 A | 11/2007 |
| JP | 2008-003425 A | 1/2008 |
| JP | 2008-003541 A | 1/2008 |
| JP | 2008-030370 A | 2/2008 |
| JP | 2008-052067 A | 3/2008 |
| JP | 2008-083115 A | 4/2008 |
| JP | 2008-090216 A | 4/2008 |
| JP | 2008-132768 A | 6/2008 |
| JP | 2008-155435 A | 7/2008 |
| JP | 2008-158180 A | 7/2008 |
| JP | 2008-160140 A | 7/2008 |
| JP | 2008-163078 A | 7/2008 |
| JP | 2008-192620 A | 8/2008 |
| JP | 2008-208223 A | 9/2008 |
| JP | 2008-537803 A | 9/2008 |
| JP | 2008-242238 A | 10/2008 |
| JP | 2008-256747 A | 10/2008 |
| JP | 2008-256804 A | 10/2008 |
| JP | 2008-257494 A | 10/2008 |
| JP | 2008-265298 A | 11/2008 |
| JP | 2008-266392 A | 11/2008 |
| JP | 2008-276729 A | 11/2008 |
| JP | 2008-281866 A | 11/2008 |
| JP | 2008-546866 A | 12/2008 |
| JP | 2009-006543 A | 1/2009 |
| JP | 2009-014886 A | 1/2009 |
| JP | 2009-042653 A | 2/2009 |
| JP | 2009-102573 A | 5/2009 |
| JP | 2009-109995 A | 5/2009 |
| JP | 2009-139526 A | 6/2009 |
| JP | 2009-143226 A | 7/2009 |
| JP | 2009-150998 A | 7/2009 |
| JP | 2009-157347 A | 7/2009 |
| JP | 2009-157348 A | 7/2009 |
| JP | 2009-157361 A | 7/2009 |
| JP | 2009-157363 A | 7/2009 |
| JP | 2009-160830 A | 7/2009 |
| JP | 2009-169389 A | 7/2009 |
| JP | 2009-175685 A | 8/2009 |
| JP | 2009-244711 A | 10/2009 |
| JP | 2009-251035 A | 10/2009 |
| JP | 2009-265626 A | 11/2009 |
| JP | 2009-269174 A | 11/2009 |
| JP | 2009-269301 A | 11/2009 |
| JP | 2009-282424 A | 12/2009 |
| JP | 2009-288395 A | 12/2009 |
| JP | 2009-294675 A | 12/2009 |
| JP | 2009-300611 A | 12/2009 |
| JP | 2009-300955 A | 12/2009 |
| JP | 2010-026112 A | 2/2010 |
| JP | 2010-032718 A | 2/2010 |
| JP | 2010-044200 A | 2/2010 |
| JP | 2010-046816 A | 3/2010 |
| JP | 2010-046817 A | 3/2010 |
| JP | 2010-054750 A | 3/2010 |
| JP | 2010-054913 A | 3/2010 |
| JP | 2010-079481 A | 4/2010 |
| JP | 2010-080290 A | 4/2010 |
| JP | 2010-096948 A | 4/2010 |
| JP | 2010-107892 A | 5/2010 |
| JP | 2010-113054 A | 5/2010 |
| JP | WO 2010050355 A1 * | 5/2010 ....... G02F 1/133528 |
| JP | 2010-139938 A | 6/2010 |
| JP | 2010-209126 A | 9/2010 |
| JP | 2010-217844 A | 9/2010 |
| JP | 2010-224345 A | 10/2010 |
| JP | 2010-224512 A | 10/2010 |
| JP | 2010-243630 A | 10/2010 |
| JP | 2010-244059 A | 10/2010 |
| JP | 2010-271447 A | 12/2010 |
| JP | 2010-271509 A | 12/2010 |
| JP | 2010-277028 A | 12/2010 |
| JP | 2010-282212 A | 12/2010 |
| JP | 2011-005854 A | 1/2011 |
| JP | 2011-007830 A | 1/2011 |
| JP | 2011-008169 A | 1/2011 |
| JP | 2011-008170 A | 1/2011 |
| JP | 2011-013302 A | 1/2011 |
| JP | 2011-013402 A | 1/2011 |
| JP | 2011-028945 A | 2/2011 |
| JP | 2011-053271 A | 3/2011 |
| JP | 2011-059488 A | 3/2011 |
| JP | 2011-067952 A | 4/2011 |
| JP | 2011-070012 A | 4/2011 |
| JP | 2011-081359 A | 4/2011 |
| JP | 2011-088429 A | 5/2011 |
| JP | 2011-090042 A | 5/2011 |
| JP | 2011-099089 A | 5/2011 |
| JP | 2011-107198 A | 6/2011 |
| JP | 2011-110718 A | 6/2011 |
| JP | 2011-140139 A | 7/2011 |
| JP | 2011-140140 A | 7/2011 |
| JP | 2011-148301 A | 8/2011 |
| JP | 2011-167914 A | 9/2011 |
| JP | 2011-181875 A | 9/2011 |
| JP | 2011-186290 A | 9/2011 |
| JP | 2011-195692 A | 10/2011 |
| JP | 2011-208147 A | 10/2011 |
| JP | 2011-215295 A | 10/2011 |
| JP | 2011-215646 A | 10/2011 |
| JP | 2011-227430 A | 11/2011 |
| JP | 2012-003007 A | 1/2012 |
| JP | 2012-003259 A | 1/2012 |
| JP | 2012-013845 A | 1/2012 |
| JP | 2012-025027 A | 2/2012 |
| JP | 2012-025850 A | 2/2012 |
| JP | 2012-027622 A | 2/2012 |
| JP | 2012-083744 A | 4/2012 |
| JP | 2012-091336 A | 5/2012 |
| JP | 2012-103470 A | 5/2012 |
| JP | 2012-118201 A | 6/2012 |
| JP | 4962661 B2 | 6/2012 |
| JP | 2012-198879 A | 10/2012 |

(56) References Cited

FOREIGN PATENT DOCUMENTS

| | | |
|---|---|---|
| JP | 5051328 B1 | 10/2012 |
| JP | 2012-214026 A | 11/2012 |
| JP | 2012-214056 A | 11/2012 |
| JP | 2012-215623 A | 11/2012 |
| JP | 2012-215724 A | 11/2012 |
| JP | 2012-220879 A | 11/2012 |
| JP | 2012-256014 A | 12/2012 |
| JP | 2013-003952 A | 1/2013 |
| JP | 2013-029919 A | 2/2013 |
| JP | 4888853 B2 | 2/2013 |
| JP | 2013-054207 A | 3/2013 |
| JP | 2013-079993 A | 5/2013 |
| JP | 2013-109116 A | 6/2013 |
| JP | 2013-539598 A | 10/2013 |
| JP | 2013-254171 A | 12/2013 |
| JP | 5370601 B1 | 12/2013 |
| JP | 2014-010315 A | 1/2014 |
| JP | 2014-010316 A | 1/2014 |
| JP | 2014-011318 A | 1/2014 |
| JP | 2014-012373 A | 1/2014 |
| JP | 2014-013367 A | 1/2014 |
| JP | 2014-015035 A | 1/2014 |
| JP | 2014-016476 A | 1/2014 |
| JP | 2014-016590 A | 1/2014 |
| JP | 2014-016591 A | 1/2014 |
| JP | 2014-032275 A | 2/2014 |
| JP | 2014-032276 A | 2/2014 |
| JP | 2014-044389 A | 3/2014 |
| JP | 2014-170223 A | 9/2014 |
| JP | 2014-215473 A | 11/2014 |
| JP | 2014-219438 A | 11/2014 |
| JP | 2015-055680 A | 3/2015 |
| JP | 2015-094903 A | 5/2015 |
| JP | 2015-132691 A | 7/2015 |
| JP | 2015-141346 A | 8/2015 |
| JP | 2015-215577 A | 12/2015 |
| JP | 2015-224267 A | 12/2015 |
| JP | 2016-021000 A | 2/2016 |
| JP | 2016-504632 A | 2/2016 |
| JP | 2017-068223 A | 4/2017 |
| KR | 2003-0060787 A | 7/2003 |
| KR | 2010-0048187 A | 5/2010 |
| KR | 2010-0078564 A | 7/2010 |
| KR | 2011-0014515 A | 2/2011 |
| KR | 10-2011-0054600 A | 5/2011 |
| KR | 10-1337005 B1 | 12/2013 |
| TW | 575501 B | 2/2004 |
| TW | 200428041 A | 12/2004 |
| TW | 200540522 A | 12/2005 |
| TW | 200704686 A | 2/2007 |
| TW | 200819871 A | 5/2008 |
| TW | 200827787 A | 7/2008 |
| TW | 200831962 A | 8/2008 |
| TW | 200931083 A | 7/2009 |
| TW | 201017236 A | 5/2010 |
| TW | 201022016 A | 6/2010 |
| TW | 201022794 A | 6/2010 |
| TW | 201035605 A | 10/2010 |
| TW | 201043675 A | 12/2010 |
| TW | 201128264 A | 8/2011 |
| TW | 201131218 A | 9/2011 |
| TW | 201142380 A | 12/2011 |
| TW | 201205160 A | 2/2012 |
| TW | 201207012 A | 2/2012 |
| TW | 201300893 A | 1/2013 |
| WO | WO 1999/036814 A1 | 7/1999 |
| WO | WO 2000/007046 A1 | 2/2000 |
| WO | WO 2011/162198 A1 | 12/2001 |
| WO | WO 2003/074611 A1 | 9/2003 |
| WO | WO 2004/081090 A1 | 9/2004 |
| WO | WO 2005/050269 A1 | 6/2005 |
| WO | WO 2006/113164 A1 | 10/2006 |
| WO | WO 2007/001555 A1 | 1/2007 |
| WO | WO 2007/020909 A1 | 2/2007 |
| WO | WO 2007/023929 A1 | 3/2007 |
| WO | WO 2008/047785 A1 | 4/2008 |
| WO | WO 2010/050355 A1 | 5/2010 |
| WO | WO 2010/074144 A1 | 7/2010 |
| WO | WO 2010/079555 A1 | 7/2010 |
| WO | WO 2010/110549 A2 | 9/2010 |
| WO | WO 2011/030757 A1 | 5/2011 |
| WO | WO 2011/058774 A1 | 5/2011 |
| WO | WO 2011/065584 A1 | 6/2011 |
| WO | WO 2011/114884 A1 | 9/2011 |
| WO | WO 2012/021643 A2 | 2/2012 |
| WO | WO 2012/026192 A1 | 3/2012 |
| WO | WO 2012/033141 A1 | 3/2012 |
| WO | WO 2012/049977 A1 | 4/2012 |
| WO | WO 2012/090405 A1 | 7/2012 |
| WO | WO 2012/141147 A1 | 10/2012 |
| WO | WO 2012/157662 A1 | 11/2012 |
| WO | WO 2012/157663 A1 | 11/2012 |
| WO | WO 2012/161078 A1 | 11/2012 |
| WO | WO 2013/069162 A1 | 5/2013 |
| WO | WO 2013/080949 A1 | 6/2013 |
| WO | WO 2013/100042 A1 | 7/2013 |
| WO | WO 2013/187134 A1 | 12/2013 |
| WO | WO 2014/021242 A1 | 2/2014 |
| WO | WO 2014/042022 A1 | 3/2014 |
| WO | WO 2014/132726 A1 | 9/2014 |
| WO | WO 2014/171386 A1 | 10/2014 |
| WO | WO 2014/203894 A1 | 12/2014 |
| WO | WO 2014/208519 A1 | 12/2014 |

OTHER PUBLICATIONS

Japanese Patent Office, Notification of Reasons for Refusal in Japanese Patent Application No. 2017-157901 (dated Jul. 3, 2018).
Dictionary of Optical Application Technologies and Materials, "Phase difference film/protective film integrated polarizing plate," *Sangyo-Gijutsu Service Center Co., Ltd.*, p. 362 (2006).
DIC Color Design, Inc., "XYZ Color System" (2015) [obtained at http://www.dic-color.com/knowledge/xyz.html].
Fukuda et al., "New Green-Emitting Sialon-Based Phosphor for White LEDs," Toshiba Review, 64(4): 60-63 (2009).
Hartlove, "Quantum Dots Unleash High Color Gamut Performance in LED-Backlit Displays," *LEDs Magazine Japan*, pp. 14-16 (Dec. 2011).
Hirosaki et al., "White Light-emitting Diode Lamps for Lighting Applications," *Fujikura Technical Journal*, 109: 1-4 (Oct. 2005).
Ishikawa, Kenji, "3D Stereoscopic Images Are Coming," Ohmsa Ltd., pp. 62-118 (Apr. 25, 2010).
Japan Industrial Standard (JIS) Z 8701, "Color Display Method by XYZ Color System and $X_{10}Y_{10}Z_{10}$ Color System," Specification of Colours According to the CIE 1931—Standard Colorimetric System and the CIE 1964—Supplementary Standard Colorimetric System, pp. 111-119 (1982).
Kato, *Jour. Geol. Soc. Japan*, 107(1): 64-67 (Jan. 2001).
Kirk-Othmer, *Concise Encyclopedia of Chemical Technology*, "Film and Sheeting Materials," p. 1159 (1988).
Kobayashi et al., "A Novel High Retardation Polymer Film for Liquid Crystal Displays," FMCp-31, pp. 871-874, presented at 16th International Display Workshops (IDW '09), World Convention Center Summit, Miyazaki, Japan, pp. 1-209 and cover pages (Dec. 9-11, 2009).
Kobayashi et al., 58th SPSJ Annual Meeting, *Polymer Preprints*, Japan, 58(1): 1362 (May 12, 2009).
Kobayashi et al., 58th SPSJ Symposium on Macromolecules, *Polymer Preprints*, Japan, 58(2): 4144 (Sep. 1, 2009).
Kobayashi et al., *The Fifteenth Microoptics Conference, Technical Digest*, pp. 30-31 (Oct. 25, 2009).
Ministry of Internal Affairs and Communications, *Japan Standard Industrial Classification*, "Manufacturing industries of plastic films, sheets, floor materials, and artificial leather," item 182 (revised Oct. 2013—enforced Apr. 1, 2014).
Nagatsuka et al., *Nitto Technical Journal*, 27(1): 46-53 (May 1989).
National Institute for Materials Science, "Success in Trial Production of White LED for Liquid Crystal Backlight—Improvement in Color Reproducibility of Liquid Crystal Display," Press Release (Mar. 19, 2008).

(56) References Cited

OTHER PUBLICATIONS

NEC, "LED Performance Required for Liquid Crystal Display for Industrial Use and LED B/L Technology," *NEC Technical Journal*, vol. 60, No. 3/2007 (Sep. 2007).
Olympus Corporation, "Series II: Basis of Polarization Analysis," obtained from Olympus Corporation website (Jul. 13, 2009).
Saito, "Illustrated Basis of Optics," *Electronics Series*, First Edition, Nikkan Kogyo Shimbun Ltd. (publisher), pp. 154-157 (Nov. 25, 2011).
Sharp Corporation, "LED Device for Liquid Crystal TV Backlight," Sharp *Technical Journal*, 99: 20-22 (Aug. 2009).
Tanaka, Kazushi, "Current Status and Future Perspective of Liquid Crystal Related Market in 2008, vol. 2," pp. 379-382 (Fuji Chimera Research Institute, Inc., Jul. 28, 2008).
Ukai, "Introduction to Flat Panel Display (6) FPD to Components and Materials Technology (1) Touch Panel," *The Chemical Times*, 2011(4): 2-7 (2011).
Wikipedia, "Backlight" (Dec. 4, 2015) [available on the internet at: https://en.wikipedia.org/wiki/Backlight].
Chinese Patent Office, The Fourth Office Action in Chinese Patent Application No. 201180030818.2 (dated Nov. 2, 2016).
Chinese Patent Office, The Third Office Action in Chinese Patent Application No. 201280024048.5 (dated Oct. 17, 2016).
Chinese Patent Office, The First Office Action in Chinese Patent Application No. 201280058791.2 (dated Dec. 3, 2015).
Chinese Patent Office, The First Office Action in Chinese Patent Application No. 201480027949.9 (dated Jun. 2, 2017).
European Patent Office, Communication Pursuant to Article 94(3) EPC, in European Patent Application No. 11798082.1 (dated Nov. 14, 2016).
European Patent Office, Communication Pursuant to Article 94(3) EPC, in European Patent Application No. 14186320.9 (dated Nov. 14, 2016).
European Patent Office, Communication Pursuant to Rule 114(2) EPC in European Patent Application No. 14186320.9 (dated Nov. 18, 2015).
European Patent Office, Extended European Search Report in European Patent Application No. 12785180.6 (dated Jan. 30, 2015).
European Patent Office, Extended European Search Report in European Patent Application No. 12786442.9 (dated Nov. 4, 2014).
European Patent Office, Extended European Search Report in European Patent Application No. 14186320.9 (dated Dec. 22, 2014).
Japanese Patent Office, Decision of Rejection in Japanese Patent Application No. 2012-132122 (dated Jan. 13, 2015).
Japanese Patent Office, International Search Report in International Patent Application No. PCT/JP2010/057956 (dated Aug. 10, 2010).
Japanese Patent Office, International Search Report in International Patent Application No. PCT/JP2011/064026 (dated Jul. 12, 2011).
Japanese Patent Office, International Search Report in International Patent Application No. PCT/JP2012/062476 (dated Jun. 26, 2012).
Japanese Patent Office, International Search Report in International Patent Application No. PCT/JP2012/062477 (dated Jul. 10, 2012).
Japanese Patent Office, International Search Report in International Patent Application No. PCT/JP2012/083848 (dated Apr. 2, 2013).
Japanese Patent Office, International Search Report in International Patent Application No. PCT/JP2013/070428 (dated Oct. 15, 2013).
Japanese Patent Office, International Search Report in International Patent Application No. PCT/JP2013/071201 (dated Sep. 10, 2013).
Japanese Patent Office, International Search Report in International Patent Application No. PCT/JP2014/052849 (dated Apr. 28, 2014).
Japanese Patent Office, International Search Report in International Patent Application No. PCT/JP2014/052850 (dated Mar. 4, 2014).
Japanese Patent Office, International Search Report in International Patent Application No. PCT/JP2014/060377 (dated Jun. 24, 2014).
Japanese Patent Office, International Search Report in International Patent Application No. PCT/JP2014/062286 (dated Jul. 22, 2014).
Japanese Patent Office, International Search Report in International Patent Application No. PCT/JP2014/062301 (dated Jul. 8, 2014).
Japanese Patent Office, International Search Report in International Patent Application No. PCT/JP2016/056336 (dated May 10, 2016).
Japanese Patent Office, International Search Report in International Patent Application No. PCT/JP2016/059301 (dated Jun. 14, 2016).
Japanese Patent Office, International Search Report in International Patent Application No. PCT/JP2016/070384 (dated Sep. 20, 2016).
Japanese Patent Office, International Search Report in International Patent Application No. PCT/JP2016/084524 (dated Jan. 31, 2017).
Japanese Patent Office, International Search Report in International Patent Application No. PCT/JP2017/011981 (dated Jun. 6, 2017).
Japanese Patent Office, International Search Report and Written Opinion in International Patent Application No. PCT/JP2012/083849 (dated Mar. 12, 2013).
Japanese Patent Office, International Search Report and Written Opinion in International Patent Application No. PCT/JP2012/083853 (dated Mar. 19, 2013).
Japanese Patent Office, Notice of Dispatch for Duplicate Patent Opposition in Japanese Opposition No. 2016-700225, Dispatch No. 042937, in Japanese Patent 5789564 (May 13, 2016).
Japanese Patent Office, Notice of Dispatch for Duplicate Patent Opposition in Japanese Opposition No. 2016-700225, Dispatch No. 042941, in Japanese Patent 5789564 (May 13, 2016).
Japanese Patent Office, Notice on Information Offer Form in Japanese Patent Application No. 2011-160702 (dated Jan. 29, 2013).
Japanese Patent Office, Notice of Information Offer in Japanese Patent Application No. 2012-132122 (dated Jul. 15, 2014) English translation.
Japanese Patent Office, Notice of Observations by Third Parties in Japanese Patent Application No. 2011-160702 (Jul. 2, 2013) English translation.
Japanese Patent Office, Notice of Reasons for Rejection in Japanese Patent Application No. 2009-259054 (dated Aug. 3, 2010).
Japanese Patent Office, Notice of Reasons for Rejection in Japanese Patent Application No. 2009-259054 (dated May 24, 2011).
Japanese Patent Office, Notice of Reasons for Rejection in Japanese Patent Application No. 2011-160702 (dated Apr. 10, 2012).
Japanese Patent Office, Notice of Reasons for Rejection in Japanese Patent Application No. 2011-160702 (dated Apr. 2, 2013).
Japanese Patent Office, Notice of Reasons for Rejection in Japanese Patent Application No. 2012-132122 (dated Dec. 3, 2013).
Japanese Patent Office, Notice of Reasons for Rejection in Japanese Patent Application No. 2012-132122 (dated Apr. 8, 2014).
Japanese Patent Office, Notice of Reasons for Revocation in Japanese Patent No. 5,789,564 (dated Oct. 26, 2016).
Japanese Patent Office, Notification of Reasons for Refusal in Japanese Patent Application No. 2012-171990 (dated Oct. 4, 2016).
Japanese Patent Office, Notification of Reasons for Refusal in Japanese Patent Application No. 2012-174966 (dated Apr. 26, 2016).
Japanese Patent Office, Notification of Reasons for Refusal in Japanese Patent Application No. 2012-174966 (dated Nov. 29, 2016).
Japanese Patent Office, Notification of Reasons for Refusal in Japanese Patent Application No. 2012-174967 (dated Mar. 8, 2016).
Japanese Patent Office, Notification of Reasons for Refusal in Japanese Patent Application No. 2012-174968 (dated Mar. 8, 2016).
Japanese Patent Office, Notification of Reasons for Refusal in Japanese Patent Application No. 2012-174969 (dated Mar. 8, 2016).
Japanese Patent Office, Notification of Reasons for Refusal in Japanese Patent Application No. 2012-175930 (dated Mar. 8, 2016).
Japanese Patent Office, Notification of Reasons for Refusal in Japanese Patent Application No. 2012-198500 (dated May 10, 2016).
Japanese Patent Office, Notification of Reasons for Refusal in Japanese Patent Application No. 2012-198500 (dated Jan. 24, 2017).
Japanese Patent Office, Notification of Reasons for Refusal in Japanese Patent Application No. 2012-198501 (dated Mar. 29, 2016).
Japanese Patent Office, Notification of Reasons for Refusal in Japanese Patent Application No. 2012-284081 (dated Aug. 2, 2016).
Japanese Patent Office, Notification of Reasons for Refusal in Japanese Patent Application No. 2012-284081 (dated Mar. 7, 2017).

(56) References Cited

OTHER PUBLICATIONS

Japanese Patent Office, Notification of Reasons for Refusal in Japanese Patent Application No. 2012-284048 (dated Jun. 14, 2016).
Japanese Patent Office, Notification of Reasons for Refusal in Japanese Patent Application No. 2012-284049 (dated Jul. 5, 2016).
Japanese Patent Office, Notification of Reasons for Refusal in Japanese Patent Application No. 2012-284085 (dated Sep. 6, 2016).
Japanese Patent Office, Notification of Reasons for Refusal in Japanese Patent Application No. 2013-023667 (dated Oct. 4, 2016).
Japanese Patent Office, Notification of Reasons for Refusal in Japanese Patent Application No. 2013-027735 (dated Oct. 4, 2016).
Japanese Patent Office, Notification of Reasons for Refusal in Japanese Patent Application No. 2013-027736 (dated Nov. 22, 2016).
Japanese Patent Office, Notification of Reasons for Refusal in Japanese Patent Application No. 2013-027738 (dated Nov. 29, 2016).
Japanese Patent Office, Notification of Reasons for Refusal in Japanese Patent Application No. 2013-027743 (dated Nov. 22, 2016).
Japanese Patent Office, Notification of Reasons for Refusal in Japanese Patent Application No. 2013-027745 (dated Nov. 15, 2016).
Japanese Patent Office, Notification of Reasons for Refusal in Japanese Patent Application No. 2013-027750 (dated Nov. 22, 2016).
Japanese Patent Office, Notification of Reasons for Refusal in Japanese Patent Application No. 2013-027754 (dated Nov. 22, 2016).
Japanese Patent Office, Notification of Reasons for Refusal in Japanese Patent Application No. 2013-027755 (dated Nov. 22, 2016).
Japanese Patent Office, Notification of Reasons for Refusal in Japanese Patent Application No. 2013-028054 (dated Nov. 15, 2016).
Japanese Patent Office, Notification of Reasons for Refusal in Japanese Patent Application No. 2013-028062 (dated Nov. 15, 2016).
Japanese Patent Office, Notification of Reasons for Refusal in Japanese Patent Application No. 2013-028157 (dated Nov. 29, 2016).
Japanese Patent Office, Notification of Reasons for Refusal in Japanese Patent Application No. 2013-028161 (dated Nov. 29, 2016).
Japanese Patent Office, Notification of Reasons for Refusal in Japanese Patent Application No. 2013-028260 (dated Oct. 4, 2016).
Japanese Patent Office, Notification of Reasons for Refusal in Japanese Patent Application No. 2013-028263 (dated Oct. 4, 2016).
Japanese Patent Office, Notification of Reasons for Refusal in Japanese Patent Application No. 2013-028271 (dated Dec. 20, 2016).
Japanese Patent Office, Notification of Reasons for Refusal in Japanese Patent Application No. 2013-028290 (dated Nov. 22, 2016).
Japanese Patent Office, Notification of Reasons for Refusal in Japanese Patent Application No. 2013-028349 (dated Dec. 20, 2016).
Japanese Patent Office, Notification of Reasons for Refusal in Japanese Patent Application No. 2013-028365 (dated Dec. 20, 2016).
Japanese Patent Office, Notification of Reasons for Refusal in Japanese Patent Application No. 2013-028378 (dated Dec. 20, 2016).
Japanese Patent Office, Notification of Reasons for Refusal in Japanese Patent Application No. 2013-028384 (dated Jan. 4, 2017).
Japanese Patent Office, Notification of Reasons for Refusal in Japanese Patent Application No. 2013-060416 (dated Jan. 17, 2017).
Japanese Patent Office, Notification of Reasons for Refusal in Japanese Patent Application No. 2013-102468 (dated Jan. 24, 2017).
Japanese Patent Office, Notification of Reasons for Refusal in Japanese Patent Application No. 2013-103844 (dated Jan. 24, 2017).
Japanese Patent Office, Notification of Reasons for Refusal in Japanese Patent Application No. 2013-103941 (dated Jan. 17, 2017).
Japanese Patent Office, Notification of Reasons for Refusal in Japanese Patent Application No. 2013-105035 (dated Feb. 14, 2017).
Japanese Patent Office, Notification of Reasons for Refusal in Japanese Patent Application No. 2013-106236 (dated Mar. 14, 2017).
Japanese Patent Office, Notification of Reasons for Refusal in Japanese Patent Application No. 2013-106235 (dated Dec. 20, 2016).
Japanese Patent Office, Notification of Reasons for Refusal in Japanese Patent Application No. 2013-181235 (dated Jan. 10, 2017).
Japanese Patent Office, Notification of Reasons for Refusal in Japanese Patent Application No. 2013-253159 (dated Jan. 10, 2017).
Japanese Patent Office, Notification of Reasons for Refusal in Japanese Patent Application No. 2013-253161 (dated Dec. 20, 2016).
Japanese Patent Office, Notification of Reasons for Refusal in Japanese Patent Application No. 2013-551788 (dated Dec. 6, 2016).
Japanese Patent Office, Notification of Reasons for Refusal in Japanese Patent Application No. 2014-006636 (dated Dec. 20, 2016).
Japanese Patent Office, Notification of Reasons for Refusal in Japanese Patent Application No. 2014-012284 (dated Jan. 17, 2017).
Japanese Patent Office, Notification of Reasons for Refusal in Japanese Patent Application No. 2014-017181 (dated Dec. 27, 2016).
Japanese Patent Office, Notification of Reasons for Refusal in Japanese Patent Application No. 2016-063352 (dated Jan. 31, 2017).
Japanese Patent Office, Notification of Reasons for Refusal in Japanese Patent Application No. 2016-063353 (dated Dec. 27, 2016).
Japanese Patent Office, Submission of Information by a Third Party in Japanese Patent Application No. 2012-132122 (Jan. 28, 2014).
Korean Patent Office, Notification of Reasons for Refusal in Korean Patent Application No. 10-2016-7031805 (dated Mar. 20, 2017).
Taiwan Patent Office, Notification for the Opinions of Examination in Taiwanese Patent Application No. 101144456 (dated Mar. 20, 2015).
Taiwan Patent Office, Notification for the Opinion of Examination in Taiwanese Patent Application No. 102127019 (dated Apr. 10, 2015).
Japanese Patent Office, Decision of Refusal in Japanese Patent Application No. 2014-543689 (dated Apr. 24, 2018).
Japanese Patent Office, Decision to Objection in Opposition No. 2016-700225 against Japanese Patent 5789564 B (Nov. 21, 2017).
Japanese Patent Office, Notification of Transmission of Duplicate of Argument in Opposition No. 2016-700225 against Japanese Patent 5789564 B (Nov. 21, 2017).
Japanese Patent Office, Notification of Reasons for Refusal in Japanese Patent Application No. 2013-028259 (dated Feb. 6, 2018).
Japanese Patent Office, Notification of Reasons for Refusal in Japanese Patent Application No. 2013-028260 (dated Feb. 6, 2018).
Japanese Patent Office, Notification of Reasons for Refusal in Japanese Patent Application No. 2013-028263 (dated Feb. 6, 2018).
Kikutani et al., "Methods of Birefringence Measurement and Examples of Data Analysis," *Seni Gakkaishi*, 66(1): 39-44 (2010).
Japanese Patent Office, Notification of Reasons for Refusal for Japanese Patent Application No. 2013-228154 (dated Mar. 27, 2018).

(56) References Cited

OTHER PUBLICATIONS

Japanese Patent Office, Notification of Reasons for Refusal for Japanese Patent Application No. 2017-127016 (dated Mar. 20, 2018).
Japanese Patent Office, Notification of Reasons for Revocation in Japanese Patent Application No. 2016-700225 (dated Jun. 9, 2017).
Japanese Patent Office, Report of Consideration by Examiner before Appeal in Appeal No. 2018-010109 in Japanese Patent Application No. 2014-543689 (Oct. 30, 2018) English machinetranslation.
Japanese Patent Office, Report of Reconsideration by Examiner before Appeal in Appeal No. 2018-012616 for Japanese Patent Application No. 2016-239613 (Nov. 6, 2018).
Japanese Patent Office, Notification of Reasons for Refusal in Japanese Patent Application No. 2018-001046 (dated Nov. 20, 2018).
Japanese Patent Office, Notification of Reasons for Refusal in Japanese Patent Application No. 2015-123737 (dated Mar. 26, 2019) English machine translation.
Olympus Corporation, "Learn More About Microscopes/Learn about polarizing microscopes from the basics/2nd Issue: Basic Polarization Analysis," pp. 3-4 [downloaded from http://microscopelabo.jp/learn/009/index_2.html] (Mar. 1, 2017).
Yasue, "Chapter 8: Polarization," Feynman Physics II (published by Iwanami Shoten), 32nd revision, pp. 87-90 (Feb. 5, 1996).
Japanese Patent Office, Office Action in Japanese Patent Application No. 2013-027749 (dated Aug. 28, 2018).
Japanese Patent Office, Notification of Reasons for Refusal in Japanese Patent Application No. 2014-228945 (dated Aug. 28, 2018).
Japanese Patent Office, Decision of Refusal in Japanese Patent Application No. 2014-525242 (dated Sep. 18, 2018).
Japanese Patent Office, Notification of Reasons for Refusal in Japanese Patent Application No. 2015-080665 (Jan. 8, 2019).
Chinese Patent Office, The Third Office Action in Chinese Patent Application No. 201480027949.9 (dated Mar. 5, 2019).
Oji Scientific Instruments, "Measurement of Width Direction Profile of Phase Difference of Stretched Film" (Jan. 2009) English translation.
Japanese Patent Office, Notice of Reasons for Refusal in Japanese Patent Application No. 2014-163499 (dated May 7, 2019).
Fujita, "Structure and Mechanism of Sensor Unit," *Transistor Technology*, 46(8): 99-106 (2009).
Japanese Patent Office, Notice of Reasons for Refusal in Japanese Patent Application No. 2013-028049 (dated May 7, 2019).
Japanese Patent Office, Notice of Reasons for Refusal in Japanese Patent Application No. 2018-164364 (dated Jun. 4, 2019).
Toyomasu et al., "Development of Negative Birefringence Polymeric Material for Novel Wide Viewing Angle Retardation Films," *Tosoh Research & Technology Review*, 48: 23-29 (2004).
Japanese Patent Office, Notice of Reasons for Refusal in Japanese Patent Application No. 2014-543689 (dated Sep. 3, 2019).

\* cited by examiner

LIQUID CRYSTAL DISPLAY DEVICE, POLARIZER AND PROTECTIVE FILM

CROSS-REFERENCE TO RELATED APPLICATIONS

This patent application is a continuation of copending U.S. patent application Ser. No. 15/476,339, filed on Mar. 31, 2017, which is a continuation of U.S. patent application Ser. No. 13/806,023, filed on Dec. 20, 2012, now U.S. Pat. No. 9,798,189, issued on Oct. 24, 2017, which is the U.S. national phase of International Patent Application No. PCT/JP2011/064026, filed Jun. 20, 2011, which claims the benefit of Japanese Patent Application No. 2011-111442, filed on May 18, 2011, and Japanese Patent Application No. 2010-141249, filed on Jun. 22, 2010, which are incorporated by reference in their entireties herein.

TECHNICAL FIELD

The present invention relates to a liquid crystal display device, a polarizer (polarizing plate), and a protective film. More specifically, the present invention relates to a liquid crystal display device, a polarizer, and a protective film, all of which ensure high visibility and are suitable for thinner liquid crystal display devices.

BACKGROUND ART

Polarizers used in liquid crystal display devices (LCDs) generally have a structure in which a polarizing film obtained by dyeing polyvinyl alcohol (PVA), etc., with iodine is sandwiched between two protective films. Triacetyl cellulose (TAC) films are commonly used as the protective films. Along with the recent trend of thinner LCDs, there is a demand for reducing the thickness of polarizers. However, when the thickness of TAC films used as protective films is reduced in order to satisfy this demand, problems such as insufficient mechanical strength and deteriorated moisture permeability occur. Moreover, TAC films are very expensive, and inexpensive alternative materials are strongly desired.

Accordingly, in order to reduce the thickness of polarizers, there is a proposal to use polyester films as protective films in place of TAC films, so that high durability can be maintained even though the thickness of the films is low (PTL 1 to PTL 3).

CITATION LIST

Patent Literature

PTL 1: Japanese Unexamined Patent Publication No. 2002-116320
PTL 2: Japanese Unexamined Patent Publication No. 2004-219620
PTL 3: Japanese Unexamined Patent Publication No. 2004-205773

SUMMARY OF INVENTION

Technical Problem

Polyester films are superior in durability to TAC films; however, unlike TAC films, polyester films have birefringence. Therefore, the use of polyester films as protective films causes problematic lower image quality due to optical distortion. That is, polyester films having birefringence have a specific optical anisotropy (retardation); therefore, when they are used as protective films, rainbow unevenness is observed from an oblique direction, and image quality deteriorates. Hence, PTL 1 to PTL 3 attempt to reduce the retardation by using copolymerized polyester as the polyester. However, even such an attempt failed to completely prevent rainbow unevenness.

The present invention was made to solve these problems. An object of the present invention is to provide a liquid crystal display device and a protective film, both of which can be used for thinner liquid crystal display devices (that is, they have sufficient mechanical strength) and do not have reduced visibility due to rainbow unevenness.

Solution to Problem

The present inventors conducted intensive studies on the mechanism of rainbow unevenness that occurs when using a polyester film as a protective film. The results revealed that the rainbow unevenness was attributable to the retardation of the polyester film and the emission spectrum of the backlight light source. Conventionally, fluorescent tubes, such as cold-cathode tubes and hot-cathode tubes, are used as backlight light sources of liquid crystal display devices. The spectral distribution of fluorescent lamps, such as cold-cathode tubes and hot-cathode tubes, shows emission spectra having a plurality of peaks. These discontinuous emission spectra are combined to provide a white light source. When a film having a high retardation transmits light, transmission intensity varies depending on the wavelength of the light. Accordingly, when the backlight light source has discontinuous emission spectra, only light of a specific wavelength is intensively transmitted, presumably leading to the occurrence of rainbow unevenness.

The present inventors have intensively studied to attain the above object, and as a result, they have found that the combined use of a specific backlight light source and a polyester film having a specific retardation makes it possible to solve the above problems, thereby leading to the completion of the present invention.

That is, the present invention includes the following inventions set forth in (1A) to (8A) and (1B) to (9B) below:

(1A) A liquid crystal display device comprising a backlight light source, and a liquid crystal cell disposed between two polarizers;
the backlight light source being a white light-emitting diode;
each of the polarizers comprising a polarizing film and protective films laminated on both sides of the polarizing film; and
at least one of the protective films being a polyester film having a retardation of 3,000 to 30,000 nm.

(2A) The liquid crystal display device as described above, wherein one polarizer is disposed on a light-incoming side of the liquid crystal cell, and the other polarizer is disposed on a light-outgoing side of the liquid crystal cell, and the protective film on a light-outgoing side of the polarizing film of the polarizer disposed on the light-outgoing side of the liquid crystal cell is a polyester film having a retardation of 3,000 to 30,000 nm.

(3A) The liquid crystal display device as described above, wherein the polyester film has a ratio of retardation to thickness-direction retardation (Re/Rth) of 0.2 or more.

(4A) A polarizer for use in a liquid crystal display device comprising a white light-emitting diode as a backlight light source;

the polarizer comprising a polarizing film and protective films laminated on both sides of the polarizing film; and at least one of the protective films being a polyester film having a retardation of 3,000 to 30,000 nm.

(5A) A protective film for a polarizer used in a liquid crystal display device comprising a white light-emitting diode as a backlight light source;

the film comprising a polyester film having a retardation of 3,000 to 30,000 nm.

(6A) The protective film as described above, wherein the polyester film has a ratio of retardation to thickness-direction retardation (Re/Rth) of 0.200 or more.

(7A) The protective film as described above, wherein the polyester film has an adhesion-facilitating layer.

(8A) The protective film as described above, wherein the polyester film comprises at least three or more layers, contains an ultraviolet absorber in the layer other than the outermost layers, and has a light transmittance at 380 nm of 20% or less.

(1B) A liquid crystal display device comprising a backlight light source, and a liquid crystal cell disposed between two polarizers;

the backlight light source being a white light-emitting diode;

each of the polarizers comprising a polarizing film and protective films laminated on both sides of the polarizing film; and at least one of the protective films being a polyester film having a retardation of 3,000 to 30,000 nm.

(2B) The liquid crystal display device according to 1B, wherein the protective film on a light-outgoing side of the polarizing film of the polarizer disposed on a light-outgoing side with respect to the liquid crystal cell is a polyester film having a retardation of 3,000 to 30,000 nm.

(3B) The liquid crystal display device according to 1B or 2B, wherein the polyester film has a ratio of retardation to thickness-direction retardation (Re/Rth) of 0.2 or more and 1.2 or less.

(4B) The liquid crystal display device according to any one of 1B to 3B, wherein the white light-emitting diode comprises a blue LED element and a yellow phosphor.

(5B) A polarizer for use in a liquid crystal display device comprising a white light-emitting diode as a backlight light source;

the polarizer comprising a polarizing film and protective films laminated on both sides of the polarizing film; and at least one of the protective films being a polyester film having a retardation of 3,000 to 30,000 nm.

(6B) A protective film for a polarizer used in a liquid crystal display device comprising a white light-emitting diode as a backlight light source;

the film comprising a polyester film having a retardation of 3,000 to 30,000 nm.

(7B) The protective film according to 6B, wherein the polyester film has a ratio of retardation to thickness-direction retardation (Re/Rth) of 0.2 or more.

(8B) The protective film according to 6B or 7B, wherein the polyester film has an adhesion-facilitating layer.

(9B) The protective film according to any one of 6B to 8B, wherein the polyester film comprises at least three or more layers, contains an ultraviolet absorber in the layer other than the outermost layers, and has a light transmittance at 380 nm of 20% or less.

Advantageous Effects of Invention

The liquid crystal display device, polarizer, and protective film of the present invention allows the transmitted light to have a spectrum approximated to that of the light source at any observation angle, and ensures excellent visibility without rainbow unevenness. Moreover, in a preferred embodiment, the protective film of the present invention has mechanical strength suitable for making the film thinner.

BRIEF DESCRIPTION OF THE SEVERAL VIEWS OF THE DRAWINGS

FIG. 1A depicts a first oriented film (2) laminated on the first polarizing film (1) on the light-outgoing side of the liquid crystal cell, whereas FIG. 1B depicts a second oriented film (2') laminated on the second polarizing film (1') on the light-incoming side of the liquid crystal cell. A backlight source (4) is provided, and the liquid crystal display device is viewed (5) on the light-outgoing side of the liquid crystal cell.

DESCRIPTION OF EMBODIMENTS

Figure 1A:
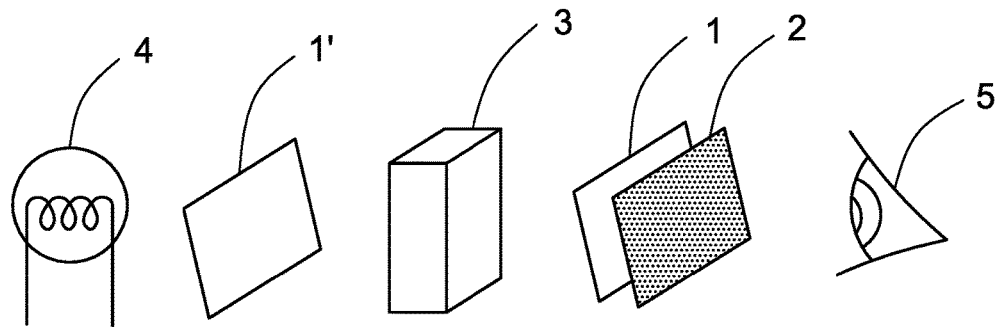
FIGS. 1A and 1B are schematic drawings of embodiments of a liquid crystal display device comprising a first polarizing film (1) and a second polarizing film (1') on opposite sides of a liquid crystal cell (3).

In general, a liquid crystal panel comprises a back module, a liquid crystal cell, and a front module in this order, starting from the side opposing a backlight light source to the side on which an image is displayed (i.e., the viewing side). The back module and the front module each ordinarily include a transparent substrate, a transparent conductive film formed on the surface of the transparent substrate on the liquid crystal cell side, and a polarizer disposed on the opposite side. In this regard, the polarizer in the back module is disposed on the side opposing the backlight light source, and the polarizer in the front module is disposed on the side on which an image is displayed (i.e., the viewing side).

The liquid crystal display device of the present invention comprises, as components, at least a backlight light source, and a liquid crystal cell disposed between two polarizers. Furthermore, the liquid crystal display device may appropriately comprise, in addition to the above components, other components, such as a color filter, a lens film, an optical diffusion sheet, and an antireflection film.

The structure of the backlight may be an edge-light system comprising a light guide plate, a reflector, etc., as components, or a direct under-light system; however, in the present invention, it is necessary to use white light-emitting diodes (white LEDs) as the backlight light source of the liquid crystal display device. In the present invention, the white LEDs refer to phosphor-based devices, that is, devices that emit white light by the combined use of phosphors with light-emitting diodes using compound semiconductors to emit blue light or ultraviolet light. Usable phosphors are yttrium-aluminum-garnet yellow phosphors, terbium-aluminum-garnet yellow phosphors, etc. Among these phosphors, white light-emitting diodes comprising light-emitting devices obtained by the combined use of yttrium-aluminumgarnet yellow phosphors with blue light-emitting diodes using compound semiconductors are suitable as the backlight light source of the present invention because of their continuous and wide emission spectrum and excellent luminous efficiency. Continuous emission spectrum means that there is no wavelength at which the light intensity is zero, at least in the visible light region. Furthermore, the method of the present invention enables a wide range of applications of white LEDs, which consume low power; therefore, it can also attain the effect of energy conservation.

In relation to this, a type of LED that utilizes the combination of red-emitting, green-emitting, and blue-emitting LEDs as a white light source (three-color LED system) has also been put to practical use. However, this method is not preferred, because it provides a narrow and discontinuous emission spectrum; therefore, it is expected to be difficult to obtain the desired effect of the present invention.

In addition, fluorescent tubes, such as cold-cathode tubes and hot-cathode tubes, which have hitherto been widely used as backlight light sources, only have a discontinuous emission spectrum with peaks at specific wavelengths; therefore, it is difficult to obtain the desired effect of the present invention.

The polarizer has a structure in which a polarizing film prepared by dyeing PVA, etc., with iodine is bonded between two protective films. The present invention is characterized by using a polyester film having a specific range of retardation as at least one of the protective films, which constitute the polarizer.

The mechanism for preventing the occurrence of rainbow unevenness by the above embodiment is considered to be as follows.

When a polyester film having birefringent properties is disposed on one side of the polarizing film, linearly polarized light emitted from the polarizing film is disturbed when passing through the polymer film. The transmitted light shows an interference color specific to the retardation of the polymer film, which is the product of the birefringence and the thickness thereof. Accordingly, when cold-cathode tubes, hot-cathode tubes, or the like that have a discontinuous emission spectrum are used as the light source, the intensity of the transmitted light varies depending on the wavelength, causing rainbow unevenness (refer to pages 30 and 31 of Proceedings of 15th Microoptics Conference).

In contrast, white-light emitting diodes have a continuous and wide emission spectrum in the visible light region. Therefore, when focusing on the envelope curve shape of the interference color spectrum of light transmitted through a birefringent material, a spectrum similar to the emission spectrum of the light source can be obtained by controlling the retardation of the polyester film. It is thus considered that rainbow unevenness is not generated, and visibility is significantly improved, because the envelope curve shape of the interference color spectrum of the light transmitted through the birefringent material becomes similar to the emission spectrum of the light source.

As described above, since the present invention uses white-light emitting diodes having a wide emission spectrum as the light source, the envelope curve shape of the spectrum of the transmitted light can be approximated to the emission spectrum of the light source with only a relatively simple structure.

To attain the above effect, the polyester film used as the protective film preferably has a retardation of 3,000 to 30,000 nm. If a polyester film having a retardation of less than 3,000 nm is used as the protective film, a strong interference color is presented when observed from an oblique direction. This makes the envelope curve shape dissimilar to the emission spectrum of the light source; therefore, excellent visibility cannot be ensured. The lower limit of the retardation is preferably 4,500 nm, more preferably 5,000 nm, still more preferably 6,000 nm, even still more preferably 8,000 nm, and further still more preferably 10,000 nm.

On the other hand, the upper limit of the retardation is 30,000 nm. A polyester film having a retardation of higher than 30,000 nm is not preferred. This is because the use of such a polyester film cannot substantially attain the effect of further improving visibility, while also leading to a considerable increase in the thickness of the film. This reduces the handling ability of the film as an industrial material.

In this connection, the retardation of the present invention can be determined by measuring refractive indices in two mutually orthogonal directions and thickness, or can also be determined using a commercially available automatic birefringence analyzer, such as KOBRA-21ADH (Oji Scientific Instruments).

Figure 1B:
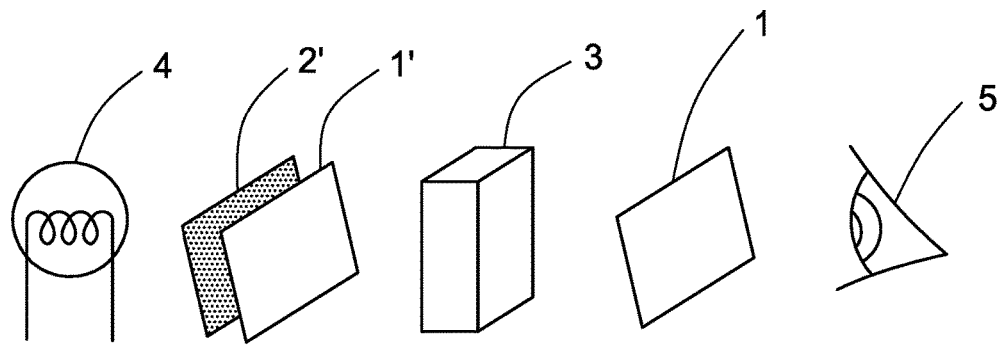
Figure 2:
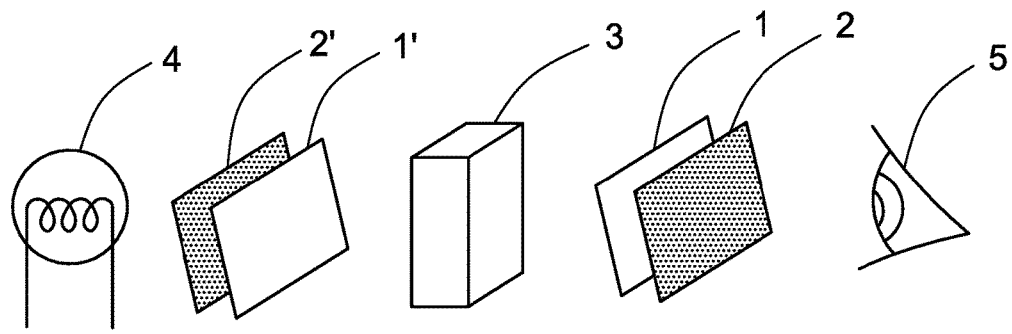
FIG. 2 is a schematic drawing of an embodiment of a liquid crystal display device comprising a first polarizing film (1) and a second polarizing film (1') on opposite sides of a liquid crystal cell (3). A first oriented film (2) is laminated on the first polarizing film (1) on the light-outgoing side of the liquid crystal cell, and a second oriented film (2') is laminated on the second polarizing film (1') on the light-incoming side of the liquid crystal cell. A backlight source (4) is provided and the liquid crystal display device is viewed (5) on the light-outgoing side of the liquid crystal cell.

The present invention is characterized in that at least one of the protective films has the above specific retardation. The position of the protective film having the specific retardation is not particularly limited; however, in the case of a liquid crystal display device comprising a polarizer disposed on the light-incoming side (light source side), a liquid crystal cell, and a polarizer disposed on the light-outgoing side (viewing side), it is preferable that the protective film on the light-incoming side of the polarizing film of the polarizer disposed on the light-incoming side, or the protective film on the light-outgoing side of the polarizing film of the polarizer disposed on the light-outgoing side is a polyester film having the specific retardation. See FIGS. 1A, 1B, and 2. In a particularly preferred embodiment, the protective film on the light-outgoing side of the polarizing film of the polarizer disposed on the light-outgoing side is a polyester film having the specific retardation. If the polyester film is disposed in a position other than the above-described positions, the polarization properties of the liquid crystal cell may be changed. Since it is not preferable to use the polymer film of the present invention in a place for which polarization properties are required, the polymer film of the present invention is preferably used as the protective film of the polarizer in such a specific position.

The polarizer of the present invention has a structure in which a polarizing film prepared by dyeing polyvinyl alcohol (PVA), etc., with iodine is bonded between two protective films, either of which characteristically has the above specific retardation. The other protective film is preferably a birefringence-free film, typified by TAC films, acrylic films, and norbornene films.

In another preferred embodiment, the surface of the polarizer used in the present invention is coated with various hard coatings so as to prevent background reflections, glare, scratches, and so on.

The polyester used in the present invention may be polyethylene terephthalate or polyethylene naphthalate, but may contain other copolymerization components. The resins of these materials have excellent transparency, and also have excellent thermal and mechanical properties. This makes it possible to easily control the retardation by stretching treatment. In particular, polyethylene terephthalate is the most suitable material, because it has high intrinsic birefringence, and therefore can relatively easily provide great retardation, even if the thickness of the film is small.

Moreover, in order to prevent degradation of the optical functional dye, such as iodine dye, the protective film of the present invention preferably has a light transmittance at a wavelength of 380 nm of 20% or less. The light transmittance at 380 nm is more preferably 15% or less, still more preferably 10% or less, and particularly preferably 5% or less. When the above light transmittance is 20% or less, the degradation of the optical functional dye caused by ultraviolet light can be prevented. In addition, the transmittance in the present invention is measured vertically with respect to the plane of the film, and can be measured with a spectrophotometer (e.g., Hitachi U-3500 spectrophotometer).

In order to adjust the transmittance of the protective film of the present invention at a wavelength of 380 nm to 20% or less, it is preferable to suitably control the type and concentration of the ultraviolet absorber, and the thickness of the film. The ultraviolet absorber used in the present invention is a known substance. Examples of the ultraviolet absorber include organic ultraviolet absorbers and inorganic ultraviolet absorbers; however, organic ultraviolet absorbers are preferred in terms of transparency. Specific examples of organic ultraviolet absorbers include benzotriazole-based ultraviolet absorbers, benzophenone-based ultraviolet absorbers, cyclic imino ester-based ultraviolet absorbers, and a combination thereof; however, the organic ultraviolet absorbers are not particularly limited as long as they have an absorbance within the range specified in the present invention. However, benzotriazole-based ultraviolet absorbers and cyclic imino ester-based ultraviolet absorbers are particularly preferred in terms of durability. When two or more ultraviolet absorbers are used in combination, ultraviolet lights of different wavelengths can be absorbed at the same time. Thus, the ultraviolet absorption effect can be further improved.

Examples of benzophenone-based ultraviolet absorbers, benzotriazole-based ultraviolet absorbers, and acrylonitrile-based ultraviolet absorbers include 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2,2'-dihydroxy-4,4'-dimethoxybenzophenone, 2,2', 4,4'-tetrahydroxybenzophenone, 2,4-di-tert-butyl-6-(5-chlorobenzotriazol-2-yl)phenol, 2-(2'-hydroxy-3'-tert-butyl-5'-methylphenyl)-5-chlorobenzotriazole, 2-(5-chloro(2H)-benzotriazol-2-yl)-4-methyl-6-(tert-butyl)phenol, 2,2'-methylenebis(4-(1,1,3,3-tetramethylbutyl)-6-(2H-benzotriazol-2-yl)phenol), etc. Examples of cyclic imino ester-based ultraviolet absorbers include 2,2'-(1,4-phenylene)bis(4H-3,1-benzoxazinon-4-one), 2-methyl-3,1-benzoxazin-4-one, 2-butyl-3,1-benzoxazin-4-one, 2-phenyl-3,1-benzoxazin-4-one, etc. However, ultraviolet absorbers are not limited to these examples.

In another preferred embodiment, in addition to the ultraviolet absorber, various additives other than catalysts are added in the range where the effect of the present invention is not impaired. Examples of such additives include inorganic particles, heat-resistant polymer particles, alkali metal compounds, alkaline earth metal compounds, phosphorus compounds, antistatic agents, light-resistant agents, flame retardants, heat stabilizers, antioxidants, anti-gelling agents, surfactants, etc. Moreover, in order to achieve high transparency, it is also preferable that the polyester film does not substantially contain particles. "Not substantially contain particles" indicates that, for example, in the case of inorganic particles, the content of inorganic elements quantified by X-ray fluorescence analysis is 50 ppm or less, preferably 10 ppm or less, and particularly preferably not greater than the detection limit.

Furthermore, in order to enhance the adhesion of the polyester film of the present invention to the polarizing film, the polyester film can be subjected to corona treatment, coating treatment, flame treatment, or the like.

In the present invention, in order to improve the adhesion of the film of the present invention to the polarizing film, the film of the present invention preferably has, on at least one side thereof, an adhesion-facilitating layer comprising at least one of polyester resin, polyurethane resin, and polyacrylic resin as a main component. The "main component" as used herein refers to, among solid components that constitute the adhesion-facilitating layer, one with 50 mass % or more. The coating solution used to form the adhesion-facilitating layer of the present invention is preferably an aqueous coating solution comprising at least one of water-soluble or water-dispersible copolymerized polyester resin, acrylic resin, and polyurethane resin. Examples of such coating solutions include a water-soluble or water-dispersible copolymerized polyester resin solution, acrylic resin solution, polyurethane resin solution, etc., as disclosed in JP 3567927 B, JP 3589232 B, JP 3589233 B, JP 3900191 B, JP 4150982 B, etc.

The adhesion-facilitating layer can be obtained by applying the coating solution to one side or both sides of a longitudinally uniaxially stretched film, followed by drying at 100 to 150° C., and further stretching the film in a transverse direction. The final amount of coating of the adhesion-facilitating layer is preferably maintained in the range of 0.05 to 0.20 g/m². When the amount of coating is less than 0.05 g/m², the resulting adhesion to the polarizing film may be insufficient. In contrast, when the amount of coating exceeds 0.20 g/m², blocking resistance may be reduced. When the adhesion-facilitating layer is provided on both sides of the polyester film, the amounts of coating of the adhesion-facilitating layers on both sides may be the same or different, and can be independently set within the above range.

It is preferable to add particles to the adhesion-facilitating layer so as to impart lubricating properties. Fine particles having an average particle diameter of 2 μm or less are preferably used. Particles having an average particle diameter of more than 2 μm tend to be easily dropped out from the coating layer. Examples of the particles to be added to the adhesion-facilitating layer include inorganic particles of titanium oxide, barium sulfate, calcium carbonate, calcium sulfate, silica, alumina, talc, kaolin, clay, calcium phosphate, mica, hectorite, zirconia, tungsten oxide, lithium fluoride, calcium fluoride, or the like; and styrene, acrylic, melamine, benzoguanamine, silicone, and other organic polymer particles. These particles may be added singly or in combination to the adhesion-facilitating layer.

Moreover, the method for applying the coating solution may be a known method. Examples thereof include reverse-roll coating, gravure coating, kiss coating, roll-brush coating, spray coating, air-knife coating, wire-bar coating, pipe doctor method, and the like. These methods can be used singly or in combination.

The average particle diameter of the above particles is measured in the following manner.

Images of the particles are taken by a scanning electron microscope (SEM). The maximum diameter of 300 to 500 individual particles (distance between the most separated two points) is measured at such a magnification that the size of the smallest single particle is 2 to 5 mm. The average of the maximum diameter of the particles is regarded as the average particle diameter.

The polyester film, which is used as the protective film of the present invention, can be produced by a general production method of polyester films. For example, non-oriented polyester obtained by melting a polyester resin and extruding the molten resin into a sheet-like shape is stretched in a longitudinal direction through the use of roll velocity difference at a temperature higher than the glass transition temperature, and then stretched in a transverse direction with a tenter, followed by heat treatment.

The polyester film of the present invention may be a uniaxially stretched film or a biaxially stretched film. However, care should be taken when a biaxially stretched film is used as the protective film, because no rainbow unevenness is observed when the film is viewed from right above the film plane, whereas rainbow unevenness may be observed when the film is viewed from an oblique direction.

This phenomenon is caused by the following factors: The biaxially stretched film has an index ellipsoid with different refractive indices in the running direction, width direction, and thickness direction, and there is a direction in which the retardation is zero (the index ellipsoid looks like a perfect circle) depending on the light transmission direction in the film. Accordingly, when the screen of the liquid crystal display is observed from a specific oblique direction, there may be a point at which the retardation is zero. Centering on that point, rainbow unevenness is generated in a concentric manner. When the angle between the position right above the film surface (normal direction) and the position at which rainbow unevenness is visible is regarded as θ, the angle θ becomes larger as the birefringence in the film plane is greater, and rainbow unevenness is less likely to be visible. Since a biaxially stretched film tends to have a lower angle θ, a uniaxially stretched film, in which rainbow unevenness is less likely to be visible, is preferred.

However, a complete uniaxial (uniaxially symmetric) film is not preferred, because mechanical strength in a direction orthogonal to the orientation direction remarkably decreases. In the present invention, it is preferable to have biaxiality (biaxial symmetry) in a range where rainbow unevenness is not substantially generated, or in a range where rainbow unevenness is not generated within the range of the viewing angle required for liquid crystal display screens.

As the means for preventing the occurrence of rainbow unevenness while maintaining the mechanical strength of the protective film, the present inventors found controlling the ratio of retardation (in-plane retardation) and thickness-direction retardation (Rth) of the protective film in a specific range. A thickness-direction phase difference indicates the average of phase differences obtained by multiplying each of two birefringence values ΔNxz and ΔNyz, when the film is viewed from the thickness-direction cross-section, by the film thickness d. The smaller the difference between the in-plane retardation and the thickness-direction retardation, the higher the isotropy of the action of birefringence depending on the observation angle. Thus, the variation of retardation due to the observation angle is reduced. Accordingly, rainbow unevenness due to the observation angle is less likely to be generated.

The ratio of retardation to thickness-direction retardation (Re/Rth) of the polyester film of the present invention is preferably 0.200 or higher, more preferably 0.500 or higher, and still more preferably 0.600 or higher. The greater the ratio of retardation to thickness-direction retardation (Re/Rth), the higher the isotropy of the action of birefringence, and the less likely the occurrence of rainbow unevenness depending on the observation angle. A complete uniaxial (uniaxially symmetric) film has a ratio of retardation to thickness-direction retardation (Re/Rth) of 2.0. However, as described above, as the film becomes closer to a complete uniaxial (uniaxially symmetric) film, mechanical strength in a direction orthogonal to the orientation direction remarkably decreases.

On the other hand, the ratio of retardation to thickness-direction retardation (Re/Rth) of the polyester film of the present invention is preferably 1.2 or less, and more preferably 1.0 or less. In order to completely prevent the occurrence of rainbow unevenness depending on the observation angle, the above ratio of retardation to thickness-direction retardation (Re/Rth) is not necessarily 2.0, but is sufficiently 1.2 or less. Moreover, even if the above ratio is 1.0 or less, it is sufficiently possible to satisfy viewing-angle characteristics required for liquid crystal display devices (right and left viewing angle: about 180, and upper and lower viewing angle: about 120).

The film-forming conditions of the polyester film of the present invention are described in detail below. The temperature for stretching in the longitudinal direction and the temperature for stretching in the transverse direction are preferably 80 to 130° C., and particularly preferably 90 to 120° C. The stretch ratio for stretching in the longitudinal direction is preferably 1.0 to 3.5, and particularly preferably 1.0 to 3.0. The stretch ratio for stretching in the transverse direction is preferably 2.5 to 6.0, and particularly preferably 3.0 to 5.5. In order to control the retardation within the above range, it is preferable to control the proportion of longitudinal stretch ratio and transverse stretch ratio. An overly small difference between the longitudinal and transverse stretch ratios is not preferred, because it is difficult to increase the retardation. To increase the retardation, it is also preferable to set the stretch temperature to low. In the subsequent heat treatment, the treatment temperature is preferably 100° C. to 250° C., and particularly preferably 180° C. to 245° C.

In order to suppress variation of the retardation, the thickness variation of the film is preferably low. Since the stretch temperature and the stretch ratios have a great influence on the film thickness variation, it is necessary to optimize the film production conditions in terms of the thickness variation. In particular, when the longitudinal stretch ratio is reduced to increase the retardation, the longitudinal thickness variation may deteriorate. Since there is an area in which the longitudinal thickness variation significantly deteriorates in a specific range of the stretch ratio, it is preferable to determine the film production conditions outside that range.

The film of the present invention preferably has a thickness variation of 5.0% or less, more preferably 4.5% or less, still more preferably 4.0% or less, and particularly preferably 3.0% or less.

As described above, it is possible to control the retardation of the film in a specific range by appropriately setting the stretch ratio, the stretch temperature, and the thickness of the film. For example, the higher the stretch ratio, the lower the stretch temperature, or the greater the thickness of the film, the more likely a great retardation is obtained. In contrast, the lower the stretch ratio, the higher the stretch temperature, or the smaller the thickness of the film, the more likely a small retardation is obtained. However, when the film thickness is increased, the phase difference in the thickness direction is likely to increase. It is therefore preferable to appropriately set the film thickness in the range described later. In addition to the control of retardation, it is necessary to determine the final film production conditions in consideration of physical properties, etc., required for processing.

The polyester film used in the present invention may have any thickness, but preferably has a thickness in the range of 15 to 300 µm, and more preferably 15 to 200 µm. Even a film having a thickness of lower than 15 µm can, in principle, provide a retardation of 3,000 nm or higher. In this case, however, the mechanical properties of the film become significantly anisotropic. This causes the film to, for example, tear or break, which significantly reduces the practicality of the film as an industrial material. The lower limit of the thickness is particularly preferably 25 µm. On the other hand, when the upper limit of the thickness of the protective film exceeds 300 µm, the polarizer is overly thick, which is not preferred. The upper limit of the thickness is preferably 200 µm in terms of the practicality as the protective film. The upper limit of the thickness is particularly preferably 100 µm, which is almost equivalent to the thickness of a general TAC film. In order to control the retardation in the range of the present invention in the above thickness range, polyethylene terephthalate is preferred as the polyester used as the film base.

Moreover, as the method of mixing an ultraviolet absorber with the polyester film of the present invention, known methods can be used in combination. For example, a masterbatch is previously produced by mixing a dried ultraviolet absorber with polymer raw materials using a kneading extruder, and the masterbatch and the polymer raw materials are mixed during the film production.

In that case, the ultraviolet absorber concentration in the masterbatch is preferably 5 to 30 mass % so as to uniformly disperse and economically mix the ultraviolet absorber. Preferred conditions for producing the masterbatch include use of a kneading extruder, and extrusion at a temperature equal to or greater than the melting point of the polyester raw material and equal to or lower than 290° C. for 1 to 15 minutes. At a temperature of 290° C. or more, a large amount of ultraviolet absorber is lost, and the viscosity of the masterbatch is significantly reduced. For an extrusion time of 1 minute or less, it is difficult to homogeneously mix the ultraviolet absorber. At this point, a stabilizer, a color tone-controlling agent, and an antistatic agent may be added, if necessary.

Furthermore, in the present invention, it is preferable that the film has a multi-layered structure including at least three or more layers, and that an ultraviolet absorber is added to the intermediate layer(s) of the film. Such a three-layer film containing an ultraviolet absorber in the intermediate layer can be specifically produced in the following manner. Polyester pellets are singly used for the outer layers. For the intermediate layer, polyester pellets and a masterbatch containing an ultraviolet absorber are mixed in a predetermined proportion, and then dried. These are supplied into a known extruder for melt-lamination, and extruded through a slit-shaped die into a sheet-like shape, followed by cooling and solidification on a casting roll, thereby forming an unstretched film. More specifically, film layers constituting both outer layers and a film layer constituting the intermediate layer are laminated by using two or more extruders, a three-layer manifold, or a junction block (e.g., a junction block having a square-shaped junction). A three-layered sheet is extruded through a die and cooled on a casting roll, thereby forming an unstretched film. In the invention, in order to remove foreign substances, which cause optical defects, from the raw material (i.e., polyester), it is preferable to perform high-precision filtration during melt extrusion. The filtration particle size (initial filtration efficiency: 95%) of a filtering medium used for high-precision filtration of the molten resin is preferably 15 µm or less. When the filtration particle size of the filtering medium is more than 15 µm, removal of foreign substances having a size of 20 µm or more is likely to be insufficient.

EXAMPLES

The present invention will hereinafter be described more specifically by way of Examples; however, the present invention is not limited to the Examples described below. The present invention can be put into practice after appropriate modifications or variations within a range meeting the gist of the present invention, all of which are included in the technical scope of the present invention. In the following Examples, the methods for the evaluation of physical properties are as follows:

(1) Retardation (Re)

A retardation is a parameter defined by the product ($\Delta Nxy \times d$) of the anisotropy ($\Delta Nxy=|Nx-Ny|$) of the refractive indices in two mutually orthogonal directions on a film and the film thickness d (nm), and is a scale indicating optical isotropy or anisotropy. The anisotropy ($\Delta Nxy$) of refractive indices in two directions is obtained by the following method. The directions of orientation axes of a film were determined using two polarizers, and the film was cut into a 4 cm×2 cm rectangle so that the direction of the orientation axe was orthogonal to either side of the rectangle. The cut piece was used as a sample for measurement.

The sample was measured for the refractive indices (Nx and Ny) in two mutually orthogonal directions and the refractive index (Nz) in the thickness direction by the use of an Abbe refractometer (NAR-4T available from Atago Co., Ltd.; measurement wavelength: 589 nm). Then, the absolute value ($|Nx-Ny|$) of the difference between the refractive indices in two directions was defined as the anisotropy ($\Delta Nxy$) of the refractive indices. The film thickness d (nm) was measured using an electric micrometer (Millitron 1245D, available from Feinpruf GmbH), and was converted to nm units. The retardation (Re) was determined by the product ($\Delta Nxy \times d$) of the anisotropy (($\Delta Nxy$) of the refractive indices and the film thickness d (nm).

(2) Thickness-Direction Retardation (Rth)

A thickness-direction retardation is a parameter indicating the average of retardation obtained by multiplying two birefringence values $\Delta Nxz$ ($=|Nx-Nz|$) and $\Delta Nyz$ ($=|Ny-Nz|$) when viewed from a film-thickness direction cross-section, by a film thickness d. The refractive indices Nx, Ny, and Nz, and the film thickness d (nm) were determined in the same manner as in the measurement of retardation, and the average value of ($\Delta Nxz \times d$) and ($\Delta Nyz \times d$) was calculated to determine the thickness-direction retardation (Rth).

(3) Light Transmittance at Wavelength of 380 nm

Using a spectrophotometer (U-3500, produced by Hitachi, Ltd.), the light transmittance of each film at a wavelength of 300 to 500 nm was measured using the air space as standard, and the light transmittance at a wavelength of 380 nm was determined.

(4) Observation of Rainbow Unevenness

A polyester film produced by the method described below was bonded to one side of a polarizing film comprising PVA and iodine so that the absorption axis of the polarizing film was vertical to the main orientation axis of the polyester film. A TAC film (produced by Fujifilm Corporation; thickness: 80 µm) was bonded to the opposite side, thereby producing a polarizer. The obtained polarizer was placed on the light-outgoing side of a liquid crystal display device that employed, as a light source, white LEDs (NSPW500CS, available from Nichia Corporation) having light-emitting devices obtained by the combined use of yttrium-aluminum-garnet yellow phosphors with blue light-emitting diodes, so that the polyester film was disposed on the viewing side. The liquid crystal display device had a polarizer comprising two TAC films as protective films on the light-incoming side of the liquid crystal cell. The polarizer of the liquid crystal display device was visually observed from the front direction and an oblique direction, and the occurrence of rainbow unevenness was determined as follows.

In Comparative Example 3, a backlight light source using cold-cathode tubes as the light source was used in place of the white LEDs.

++: no formation of rainbow unevenness observed from any direction.

+: partial, very light rainbow unevenness observed from an oblique direction

−: clear rainbow unevenness observed from an oblique direction (5) Tear Strength The tear strength of each film was measured according to JIS P-8116 using an Elmendorf tearing tester (produced by Toyo Seiki Seisaku-sho, Ltd.). The tear direction was parallel to the orientation axis direction of the film, and the results were evaluated as follows. The orientation axis direction was measured by a molecular orientation analyzer (MOA-6004, produced by Oji Scientific Instruments).

+: Tear strength was 50 mN or more.

−: Tear strength was less than 50 mN.

Production Example 1: Polyester A

The temperature of an esterification reaction vessel was raised, and when the temperature reached 200° C., 86.4 parts by mass of terephthalic acid and 64.6 parts by mass of ethylene glycol were put in the vessel. While stirring the mixture, 0.017 parts by mass of antimony trioxide, 0.064 parts by mass of magnesium acetate tetrahydrate, and 0.16 parts by mass of triethylamine were added as catalysts. Subsequently, the pressure and temperature were raised, and pressure esterification was performed at a gage pressure of 0.34 MPa at 240° C. Then, the pressure in the esterification reaction vessel was returned to normal pressure, and 0.014 parts by mass of phosphoric acid was added. Further, the temperature was raised to 260° C. over 15 minutes, and 0.012 parts by mass of trimethyl phosphate was added. Subsequently, after 15 minutes, dispersion was performed with a high-pressure disperser. After 15 minutes, the obtained esterification reaction product was transferred to a polycondensation reaction vessel, and a polycondensation reaction was performed at 280° C. under reduced pressure.

After completion of the polycondensation reaction, filtration was performed using a Naslon filter (95% cut size: 5 μm). The resultant was extruded through a nozzle into a strand shape, cooled and solidified with cooling water, which had been previously filtered (pore size: 1 μm or less), and cut into pellets. The obtained polyethylene terephthalate resin (A) had an intrinsic viscosity of 0.62 dl/g, and did not substantially contain inert particles and internally deposited particles (hereafter abbreviated as "PET (A)").

Production Example 2: Polyester B

A dried ultraviolet absorber (2,2'-(1,4-phenylene)bis(4H-3,1-benzoxazinon-4-one) (10 parts by mass) and 90 parts by mass of particle-free PET (A) (intrinsic viscosity: 0.62 dl/g) were mixed, and a kneading extruder was used to obtain a polyethylene terephthalate resin (B) containing the ultraviolet absorber (hereafter abbreviated as "PET (B)").

Production Example 3: Preparation of Adhesion-Modified Coating Solution

A transesterification reaction and a polycondensation reaction were performed in a standard manner to prepare a water-dispersible sulfonic acid metal salt group-containing copolymerized polyester resin comprising, as dicarboxylic acid components (based on the entire dicarboxylic acid components), 46 mol % of terephthalic acid, 46 mol % of isophthalic acid, and 8 mol % of sodium 5-sulfonatoisophthalate; and as glycol components (based on the entire glycol components), 50 mol % of ethylene glycol and 50 mol % of neopentyl glycol. Subsequently, 51.4 parts by mass of water, 38 parts by mass of isopropyl alcohol, 5 parts by mass of n-butyl cellosolve, and 0.06 parts by mass of nonionic surfactant were mixed, and then stirred under heating. When the temperature reached 77° C., 5 parts by mass of the above water-dispersible sulfonic acid metal salt group-containing copolymerized polyester resin was added, and continuously stirred until the mass of the resin disappeared. Thereafter, the resulting resin aqueous dispersion was cooled to room temperature, thereby obtaining a homogeneous water-dispersible copolymerized polyester resin solution having a solids content of 5.0 mass %. Furthermore, 3 parts by mass of aggregate silica particles (Sylysia 310, produced by Fuji Silysia Chemical Ltd.) was dispersed in 50 parts by mass of water. Then, 0.54 parts by mass of the water dispersion of Sylysia 310 was added to 99.46 parts by mass of the above water-dispersible copolymerized polyester resin solution. While stirring the mixture, 20 parts by mass of water was added, thereby obtaining an adhesion-modified coating solution.

Example 1

As the starting materials for the base film intermediate layer, 90 parts by mass of particle-free PET (A) resin pellets and 10 parts by mass of ultraviolet absorber-containing PET (B) resin pellets were vacuum-dried (1 Torr) at 135° C. for 6 hours, and then supplied to an extruder 2 (for the intermediate layer II). Further, PET (A) was dried by a standard method, supplied to extruders 1 (each for the outer layer I and the outer layer III), and melted at 285° C. These two polymers were each filtered through a filtering medium of a stainless steel sintered body (nominal filtering accuracy: 10 μm-particle 95% cut), laminated by two types of three-layered junction blocks, and extruded through a die into a sheet-like shape. The resulting sheet was cooled and solidified by winding the sheet around a casting drum having a surface temperature of 30° C. by an electrostatic casting method, thereby forming an unstretched film. At this time, the discharge of each extruder was adjusted so that the thickness ratio of layer I, layer II, and layer III was 10:80:10.

Then, the above-prepared adhesion-modified coating solution was applied to both sides of the unstretched PET film by reverse-roll coating so that the amount of dried coating was 0.08 g/m², followed by drying at 80° C. for 20 seconds.

The unstretched film, on which a coating layer had been formed, was guided to a tenter stretching machine. While holding the edges of the film with clips, the film was guided to a hot-air zone with a temperature of 125° C., and stretched 4.0 times in the width direction. Subsequently, while maintaining the width of the film stretched in the width direction, the film was treated at a temperature of 225° C. for 30 seconds, and further subjected to 3% relaxation treatment in the width direction. Thus, a uniaxially oriented PET film having a thickness of about 50 μm was obtained.

Example 2

A uniaxially oriented PET film having a thickness of about 100 μm was obtained in the same manner as in Example 1, except that the thickness of the unstretched film was changed.

Example 3

An unstretched film produced in the same manner as in Example 1 was heated to 105° C. using heated rolls and an infrared heater. Thereafter, the film was stretched 1.5 times in the running direction by rolls having different peripheral speeds, and then stretched 4.0 times in the width direction in the same manner as in Example 1, thereby obtaining a biaxially oriented PET film having a thickness of about 50 μm.

Example 4

An unstretched film was stretched 2.0 times in the running direction and 4.0 times in the width direction in the same manner as in Example 3, thereby obtaining a biaxially oriented PET film having a thickness of about 50 μm.

Example 5

An unstretched film was stretched 3.3 times in the running direction and 4.0 times in the width direction in the same manner as in Example 3, thereby obtaining a biaxially oriented PET film having a thickness of about 75 μm.

Example 6

A uniaxially oriented PET film having a thickness of 50 μm was obtained in the same manner as in Example 1, without using the ultraviolet absorber-containing PET resin (B) in the intermediate layer. The obtained film did not have rainbow unevenness, but had high light transmittance at 380 nm, which may degrade the optical functional dye.

Example 7

An unstretched film was stretched 4.0 times in the running direction and 1.0 time in the width direction in the same manner as in Example 3, thereby obtaining a uniaxially oriented PET film having a thickness of about 100 μm. The obtained film had a retardation of 3,000 nm or more. Although the visibility was excellent, the mechanical strength was slightly inferior.

Example 8

An unstretched film was stretched 3.5 times in the running direction and 3.7 times in the width direction in the same manner as in Example 3, thereby obtaining a biaxially oriented PET film having a thickness of about 250 μm. The obtained film had a retardation of 4,500 nm or more; however, the Re/Rth ratio was less than 0.2, and thus, very slight rainbow unevenness was observed when the film was viewed from an oblique direction.

Example 9

An unstretched film was stretched 1.0 time in the running direction and 3.5 times in the width direction in the same manner as in Example 1, thereby obtaining a uniaxially oriented PET film having a thickness of about 75 μm.

Example 10

A uniaxially oriented PET film having a thickness of about 275 μm was obtained in the same manner as in Example 1, except that the thickness of the unstretched film was changed.

Comparative Example 1

An unstretched film was stretched 3.6 times in the running direction and 4.0 times in the width direction in the same manner as in Example 3, thereby obtaining a biaxially oriented PET film having a thickness of about 38 μm. The obtained film had a low retardation, and rainbow unevenness was observed when the film was viewed from an oblique direction.

Comparative Example 2

A uniaxially oriented PET film having a thickness of about 10 μm was obtained in the same manner as in Example 1, except that the thickness of the unstretched film was changed. The obtained film was very easy to tear and had no body. Therefore, this film could not be used as the protective film. Moreover, retardation was low, and rainbow unevenness was observed.

Comparative Example 3

The same procedure as in Example 1 was carried out, except that the observation of rainbow unevenness was performed using cold-cathode tubes as the light source of the liquid crystal display device.

Table 1 below shows the results of the observation of rainbow unevenness and the measurement of tear strength of the polyester films of Examples 1 to 10 and Comparative Examples 1 to 3.

TABLE 1

| | Thickness (μm) | Running-direction stretch ratio | Width-direction stretch ratio | Nx | Ny | Nz | Re (nm) | Rth (nm) | Re/Rth ratio | Observation of rainbow unevenness | Tear strength | 380-nm light transmittance (%) |
|---|---|---|---|---|---|---|---|---|---|---|---|---|
| Ex. 1 | 50 | 1.0 | 4.0 | 1.593 | 1.697 | 1.513 | 5177 | 6602 | 0.784 | ++ | + | 8.5 |
| Ex. 2 | 100 | 1.0 | 4.0 | 1.594 | 1.696 | 1.513 | 10200 | 13233 | 0.771 | ++ | + | 1.0 |
| Ex. 3 | 50 | 1.5 | 4.0 | 1.608 | 1.686 | 1.508 | 3915 | 6965 | 0.562 | + | + | 8.5 |
| Ex. 4 | 50 | 2.0 | 4.0 | 1.617 | 1.681 | 1.502 | 3215 | 7341 | 0.438 | + | + | 8.5 |
| Ex. 5 | 75 | 3.3 | 4.0 | 1.640 | 1.688 | 1.498 | 3570 | 12480 | 0.286 | + | + | 2.5 |
| Ex. 6 | 50 | 1.0 | 4.0 | 1.593 | 1.697 | 1.513 | 5177 | 6602 | 0.784 | ++ | + | 79.0 |
| Ex. 7 | 100 | 4.0 | 1.0 | 1.735 | 1.570 | 1.520 | 16500 | 13250 | 1.245 | ++ | − | 1.0 |
| Ex. 8 | 250 | 3.5 | 3.7 | 1.660 | 1.687 | 1.522 | 6750 | 37875 | 0.178 | + | + | 0.4 |
| Ex. 9 | 75 | 1.0 | 3.5 | 1.580 | 1.678 | 1.525 | 7350 | 7800 | 0.942 | ++ | + | 2.5 |
| Ex. 10 | 275 | 1.0 | 4.0 | 1.593 | 1.697 | 1.513 | 28476 | 36314 | 0.784 | ++ | + | 0.3 |
| Comp. Ex. 1 | 38 | 3.6 | 4.0 | 1.649 | 1.680 | 1.497 | 1178 | 6365 | 0.185 | − | + | 15.0 |
| Comp. Ex. 2 | 10 | 1.0 | 4.0 | 1.591 | 1.698 | 1.513 | 1070 | 1318 | 0.812 | − | − | 56.0 |
| Comp. Ex. 3 | 50 | 1.0 | 4.0 | 1.593 | 1.697 | 1.513 | 5177 | 6602 | 0.784 | − | + | 8.5 |

In the observation of rainbow unevenness in the films of Examples 1 to 10, as shown in Table 1, rainbow unevenness was not observed in any films when the films were viewed from the front direction. When the films of Examples 3 to 5 and 8 were viewed from an oblique direction, rainbow unevenness was partially observed; whereas when the films of Examples 1, 2, 6, 7, 9, and 10 were viewed from an oblique direction, no rainbow unevenness was observed at all. In contrast, when the films of Comparative Examples 1 to 3 were viewed from an oblique direction, rainbow unevenness was clearly observed.

It was also demonstrated that the tear strength of the films of Example 7 and Comparative Example 2 was not sufficient. The reason for this is considered to be because the film of Example 7 had an overly high Re/Rth ratio, and the film of Comparative Example 2 had an overly low film thickness.

INDUSTRIAL APPLICABILITY

The liquid crystal display device, polarizer, and protective film of the present invention are very highly industrially applicable, because the use of them contributes to thinner LCDs and lower cost, without reduction in visibility caused by rainbow unevenness.

The invention claimed is:

1. A display device comprising a first polarizer, a liquid crystal cell, a second polarizer, and a backlight source, wherein
   the liquid crystal cell has a light-outgoing side and a light-incoming side,
   the first polarizer is disposed on the light-outgoing side of the liquid crystal cell,
   the first polarizer comprises (a) a first polarizing film and (b) a first protective film laminated on the light-outgoing side of the first polarizing film,
   the second polarizer is disposed on the light-incoming side of the liquid crystal cell,
   the second polarizer comprises (a) a second polarizing film and (b) a second protective film laminated on the light-incoming side of the second polarizing film,
   the first protective film optionally is an oriented film having an in-plane retardation of 3,215 nm or more and less than 10,000 nm and a ratio of in-plane retardation to thickness-direction retardation (Re/Rth) of 0.5 to 2.0,
   the second protective film is an oriented film having an in-plane retardation of 3,215 nm or more and less than 10,000 nm and a ratio of in-plane retardation to thickness-direction retardation (Re/Rth) of 0.5 to 2.0, and
   no oriented film having an in-plane retardation of 3,215 to 30,000 nm is disposed between the light-incoming side of the first polarizing film and the light-outgoing side of the second polarizing film.

2. The display device of claim 1, wherein the first protective film is an oriented film having an in-plane retardation of 3,215 nm or more and less than 10,000 nm and a ratio of in-plane retardation to thickness-direction retardation (Re/Rth) of 0.5 to 2.0.

3. The display device of claim 2, wherein the first protective film that is an oriented film having an in-plane retardation of 3,215 nm or more and less than 10,000 nm and a ratio of in-plane retardation to thickness-direction retardation (Re/Rth) of 0.5 to 2.0 is a polyester film.

4. The display device of claim 1, wherein the second protective film that is an oriented film having an in-plane retardation of 3,215 nm or more and less than 10,000 nm and a ratio of in-plane retardation to thickness-direction retardation (Re/Rth) of 0.5 to 2.0 is a polyester film.

5. The display device of claim 1, wherein the first protective film is not an oriented film having an in-plane retardation of 3,215 nm or more and less than 10,000 nm and a ratio of in-plane retardation to thickness-direction retardation (Re/Rth) of 0.5 to 2.0 and is a triacetyl cellulose film, an acrylic film, or a norbornene film.

6. The display device of claim 1, wherein the first protective film is not an oriented film having an in-plane retardation of 3,215 nm or more and less than 10,000 nm and a ratio of in-plane retardation to thickness-direction retardation (Re/Rth) of 0.5 to 2.0 and is a birefringence-free film.

* * * * *